(12) United States Patent
Deshpande et al.

(10) Patent No.: US 10,173,178 B1
(45) Date of Patent: Jan. 8, 2019

(54) CARBON DIOXIDE SEPARATOR MEMBRANE STRUCTURE, METHOD OF MANUFACTURING SAME, AND CARBON DIOXIDE SEPARATOR INCLUDING SAME

(71) Applicants: BLOOM ENERGY CORPORATION, Sunnyvale, CA (US); Indian Institute of Technology Madras, Chennai (IN)

(72) Inventors: Abhijit Deshpande, Chennai (IN); Susy Varughese, Chennai (IN); Rahul Shevate, Hadapsar (IN); Elamathi Swaminathan, Madanapalle (IN); Kadhiresan Ambalavanan, Mumbai (IN); Shraddesh Malviya, Mumbai (IN); Chockkalingam Karuppaiah, Cupertino, CA (US); Arne Ballantine, Palo Alto, CA (US); Michael Gasda, Mountain View, CA (US)

(73) Assignees: BLOOM ENERGY CORPORATION, Sunnyvale, CA (US); INDIAN INSTITUTE OF TECHNOLOGY MADRAS, Chennai (IN)

( * ) Notice: Subject to any disclaimer, the term of this patent is extended or adjusted under 35 U.S.C. 154(b) by 189 days.

(21) Appl. No.: 15/138,400

(22) Filed: Apr. 26, 2016

Related U.S. Application Data

(60) Provisional application No. 62/153,271, filed on Apr. 27, 2015.

(51) Int. Cl.
 B01D 71/38 (2006.01)
 B01D 53/22 (2006.01)
 (Continued)

(52) U.S. Cl.
 CPC .......... B01D 71/38 (2013.01); B01D 53/228 (2013.01); B01D 67/0006 (2013.01);
 (Continued)

(58) Field of Classification Search
 CPC B01D 53/22; B01D 53/228; B01D 2053/221; B01D 67/0006; B01D 69/10;
 (Continued)

(56) References Cited

U.S. PATENT DOCUMENTS

| 6,924,053 B2 | 8/2005 | McElroy |
| 7,045,238 B2 | 5/2006 | Gottmann et al. |

(Continued)

FOREIGN PATENT DOCUMENTS

WO    WO 2010/125443 A1    11/2010

OTHER PUBLICATIONS

Notification of Transmittal of the International Search Report and the Written Opinion of the Searching Authority for PCT/US2016/016353, dated May 23, 2016, 14 pages.

*Primary Examiner* — Jason M Greene
(74) *Attorney, Agent, or Firm* — The Marbury Law Group PLLC

(57) ABSTRACT

A carbon dioxide membrane structure, a method of making the same, and a carbon dioxide separator including the same. The membrane structure may include a carbon dioxide separation membrane containing PVA and a carrier, and a polysulfone-based support having an average pore size ranging from about 40 to about 90 μm.

13 Claims, 19 Drawing Sheets

(51) Int. Cl.
   *B01D 67/00*   (2006.01)
   *B01D 69/12*   (2006.01)
   *H01M 8/0668*  (2016.01)

(52) U.S. Cl.
   CPC ........ *B01D 69/125* (2013.01); *H01M 8/0668* (2013.01); *B01D 2053/221* (2013.01); *B01D 2323/30* (2013.01)

(58) Field of Classification Search
   CPC ................. B01D 69/125; B01D 71/38; B01D 2257/504; B01D 2323/30; H01M 8/0668
   See application file for complete search history.

(56) References Cited

U.S. PATENT DOCUMENTS

| | | | |
|---|---|---|---|
| 7,546,946 B2 * | 6/2009 | Hefner | B41M 5/30 235/375 |
| 7,591,880 B2 | 9/2009 | Levan et al. | |
| 7,833,668 B2 | 11/2010 | Ballantine et al. | |
| 7,883,803 B2 | 2/2011 | McElroy et al. | |
| 8,101,307 B2 | 1/2012 | McElroy et al. | |
| 9,190,685 B2 | 11/2015 | McElroy et al. | |
| 9,287,571 B2 | 3/2016 | McElroy et al. | |
| 2002/0110503 A1 | 8/2002 | Gittleman et al. | |
| 2006/0172160 A1 | 8/2006 | Min et al. | |
| 2007/0178338 A1 | 8/2007 | McElroy et al. | |
| 2008/0078290 A1 * | 4/2008 | Hagg | B01D 53/228 95/51 |
| 2008/0241612 A1 | 10/2008 | Ballantine et al. | |
| 2008/0241638 A1 | 10/2008 | McElroy et al. | |
| 2009/0208785 A1 | 8/2009 | McElroy et al. | |
| 2010/0239924 A1 | 9/2010 | McElroy et al. | |
| 2010/0266923 A1 | 10/2010 | McElroy et al. | |
| 2011/0167821 A1 | 7/2011 | Baker et al. | |
| 2012/0067812 A1 | 3/2012 | Muratani et al. | |
| 2013/0108936 A1 | 5/2013 | McElroy et al. | |
| 2013/0284022 A1 | 10/2013 | Hiraki et al. | |
| 2015/0182917 A1 * | 7/2015 | Hosoya | B01D 53/228 422/617 |
| 2015/0321150 A1 * | 11/2015 | Kurahashi | B01D 53/228 427/243 |
| 2016/0008766 A1 * | 1/2016 | Aburaya | B01D 71/38 422/222 |
| 2016/0151740 A1 * | 6/2016 | Ouchi | B01D 53/228 422/212 |
| 2016/0158707 A1 * | 6/2016 | Heijnen | B01D 69/10 210/490 |
| 2016/0248111 A1 | 8/2016 | Gasda et al. | |
| 2017/0232398 A1 * | 8/2017 | Ota | B01D 53/228 95/51 |

* cited by examiner

Step 3:

Diethanolamine

Membrane G2

Step 1:

Step 2:

CARBON DIOXIDE SEPARATOR MEMBRANE STRUCTURE, METHOD OF MANUFACTURING SAME, AND CARBON DIOXIDE SEPARATOR INCLUDING SAME

FIELD

Aspects of the present disclosure relate generally to a carbon dioxide separator membrane structure, a method of manufacturing the same, and a carbon dioxide separator including the same.

BACKGROUND

Fuel cells are electrochemical devices which can convert energy stored in fuels to electrical energy efficiencies. High temperature fuel cells include solid oxide fuel cells (SOFC) and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

Reformed natural gas is used as source of $H_2$ fuel for SOFC system. Reformation also produces $CO_2$ that does not take part in fuel cell reaction at anode surface and comes out along with product stream, which is mainly water (as steam), CO, and un-utilized $H_2$. Part of the un-utilized fuel should to be recycled back to the inlet feed stream, and non-reactive $CO_2$ in recycle feed reduces the overall solid oxide fuel cell system efficiency.

Removing $CO_2$ from the anode exhaust stream of SOFC systems using a carbon dioxide separator can improve efficiency. $CO_2$ can be separated from a gas mixture using solvents/sorbents, membranes, or cryogenics. A scrubbing process for $CO_2$ separation uses amine solvents. Pressure swing adsorption and temperature swing adsorption are methods to remove $CO_2$ using solid adsorbents such as zeolites and activated carbon. Cryogenics use sub-zero temperature condition for $CO_2$ separation.

However, $CO_2$ separation via porous and non-porous membranes is simpler than other techniques. Accordingly, there is a need for a $CO_2$ separator that includes an improved $CO_2$ membrane structure.

SUMMARY

Exemplary embodiments of the present disclosure provide a carbon dioxide separation membrane comprising: a base polymer comprising poly vinyl alcohol (PVA); and a carrier selected from at least one of: poly aniline (PANI); sulfosuccinic acid; diethylenetriamine (DETA); imidazole; benzimidazole; diethanolamine (DEA); DEA and glycine; and DETA and imidazole, wherein the carbon dioxide separation membrane is configured to operate at temperatures ranging from about 80° C. to about 150° C.

Exemplary embodiments of the present disclosure provide a carbon dioxide separator of a fuel cell system, the carbon dioxide separator comprising: a sweep channel configured to receive a sweep gas; a feed channel configured to receive a fuel exhaust stream; and carbon dioxide separation membrane disposed between the sweep channel and the feed channel, the carbon dioxide separation membrane comprising: a base polymer comprising poly vinyl alcohol (PVA); and a carrier selected from: poly aniline (PANI); sulfosuccinic acid; diethylenetriamine (DETA); imidazole; benzimidazole; diethanolamine (DEA); DEA and glycine; and DETA and imidazole.

Exemplary embodiments of the present disclosure provide a membrane structure comprising a carbon dioxide separation membrane represented by one of Chemical Formulas 1-9:

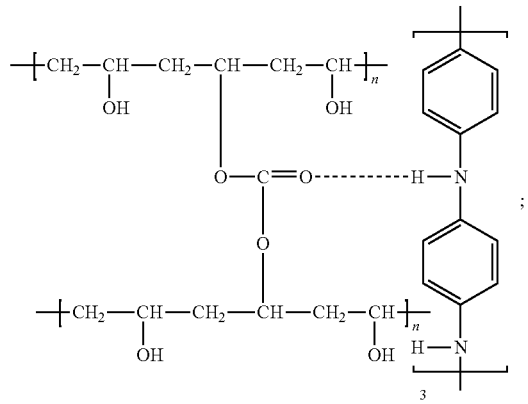

Chemical Formula 1

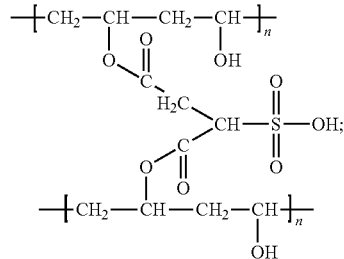

Chemical Formula 2

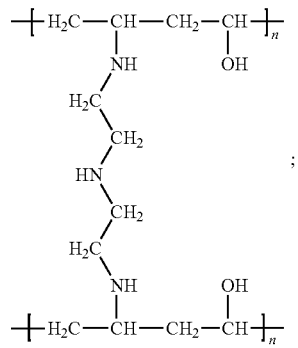

Chemical Formula 3

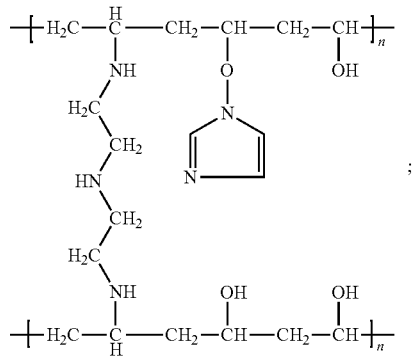

Chemical Formula 4

-continued

Chemical Formula 5

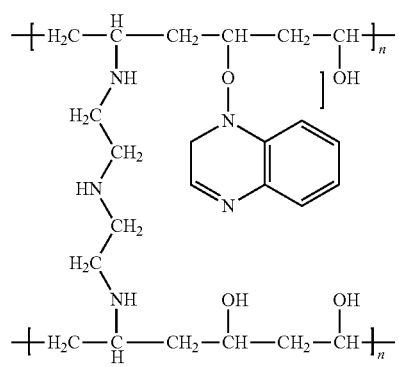

Chemical Formula 6

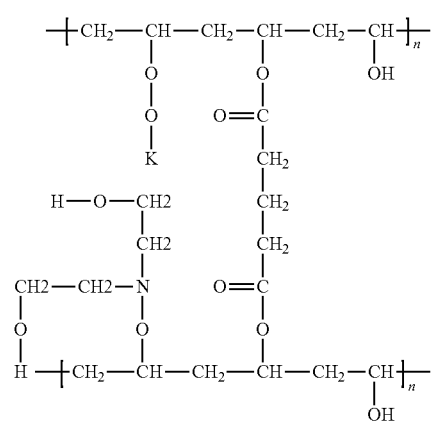

Chemical Formula 7

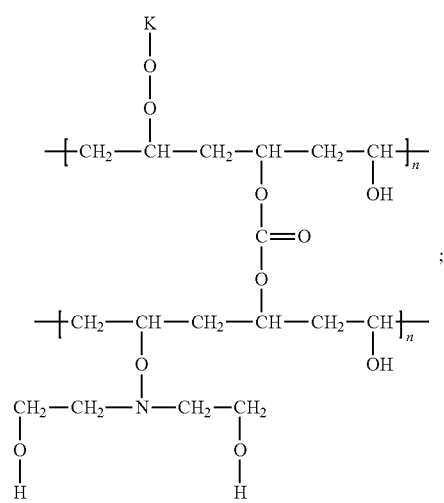

-continued

Chemical Formula 8

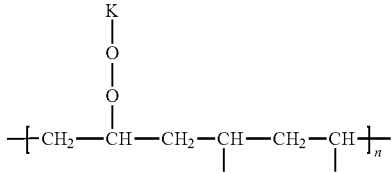

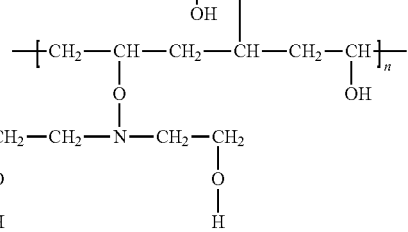

; or

Chemical Formula 9

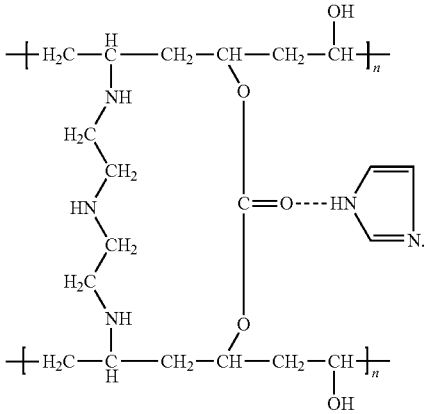

In Chemical Formulas 1-9, "n" is a number ranging from 2700 to 3000, and "m" is a number ranging from 155 to 175, and the carbon dioxide separation membrane is configured to operate at temperatures ranging from about 80° C. to about 150° C.

Exemplary embodiments of the present disclosure provide a fuel cell system comprising: a fuel cell stack; and the carbon dioxide separator described above operatively connected to the fuel cell stack.

Exemplary embodiments of the present disclosure provide a method of forming a membrane support, the method comprising: applying a solution to a support to form a film, the solution comprising polysulfone and polyvinyl pyrrolidone (PVP); immersing the film in a first solvent to perform a first solvent extraction step; immersing the film in a second solvent to perform a second solvent extraction step; and drying the film to form the membrane support.

Exemplary embodiments of the present disclosure provide a method of forming a casting solution for forming a carbon dioxide separation membrane, the method comprising: mixing a polyvinyl alcohol (PVA), a solvent, and an initiator to form a first solution; mixing a cross-linker into the first solution; mixing a carrier into the first solution; and increasing the viscosity of the first solution to at least about 2500 cp, to form the casting solution.

Exemplary embodiments of the present disclosure provide a method of forming a free standing carbon dioxide separation membrane, comprising applying a membrane casting solution to a PTFE sheet, heating the casting solution to form a carbon dioxide separation membrane; and removing the carbon dioxide separation membrane from the PFTE sheet to form the free standing a carbon dioxide separation membrane.

DETAILED DESCRIPTION OF THE EXEMPLARY EMBODIMENTS

Exemplary embodiments of the present disclosure show how carbon dioxide separation devices may be used together with a fuel cell system, such as a solid oxide fuel cell system. Additional embodiments illustrate how water separation devices may be used together with a fuel cell system, such as a solid oxide fuel cell system. Additional embodiments illustrate how carbon dioxide separation devices and water separation devices may be used together with a fuel cell system, such as a solid oxide fuel cell system. It should be noted that other fuel cell systems, such as molten carbonate systems, may also be used.

Figure 1:
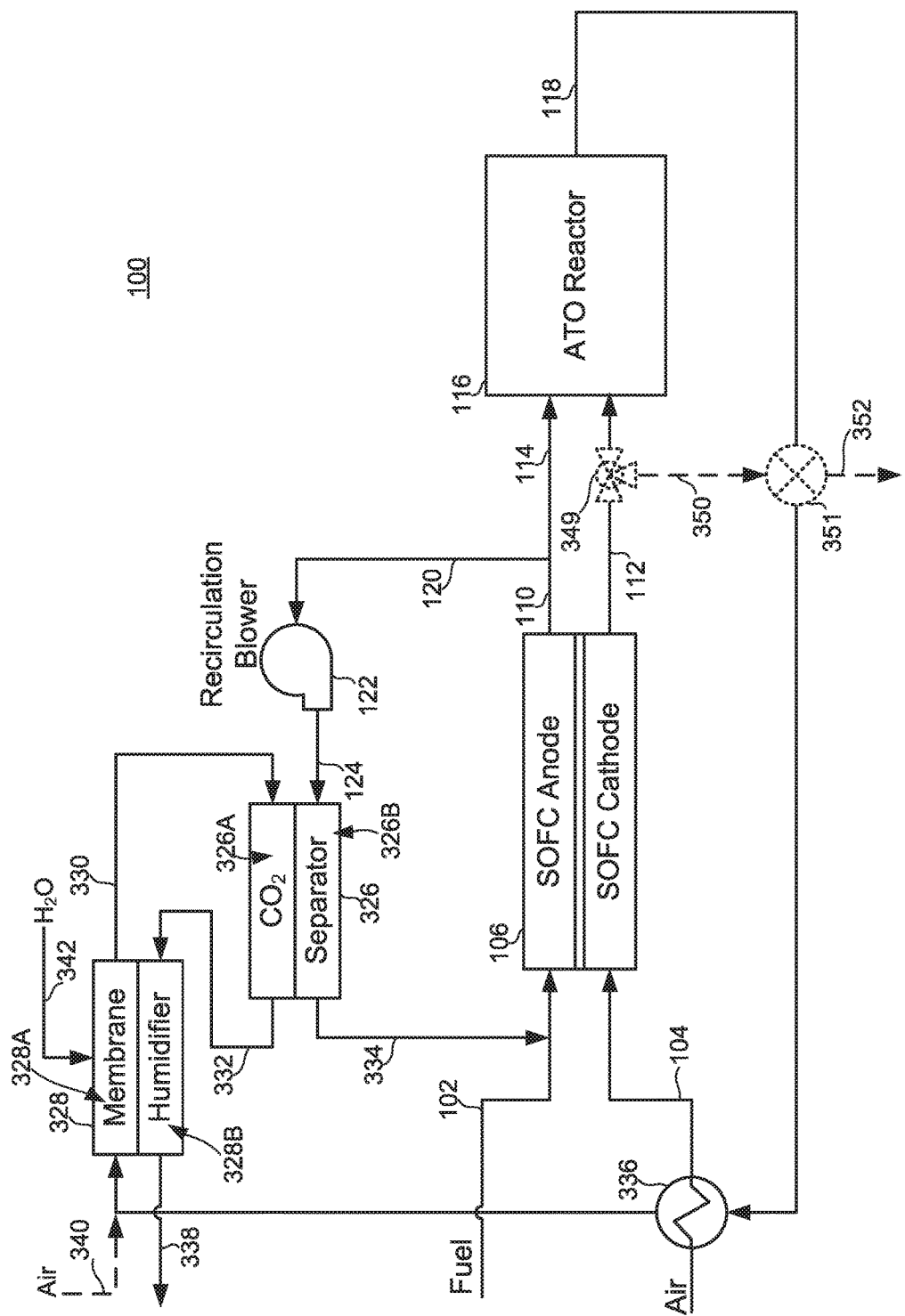
FIGS. 1-6 are schematics of fuel cell systems according to various embodiments of the present invention.

FIG. 1 illustrates a fuel cell system 100 according to one embodiment of the present invention. Preferably, the system 100 is a high temperature fuel cell stack system, such as a solid oxide fuel cell (SOFC) system. The system 100 may be a regenerative system such as a solid oxide regenerative fuel cell (SORFC) system which operates in both fuel cell (i.e., discharge or power generation) and electrolysis (i.e., charge) modes or it may be a non-regenerative system which only operates in the fuel cell mode.

The system 100 contains a high temperature fuel cell stack 106. The stack may contain a plurality of SOFCs or SORFCs. The high temperature fuel cell stack 106 is illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite. Each fuel cell contains an electrolyte, an anode electrode on one side of the electrolyte, a cathode electrode on the other side of the electrolyte, as well as other components, such as interconnects (e.g., separator plates/electrical contacts), seals, etc. In an SOFC operating in the fuel cell mode, the oxidizer, such as air or oxygen gas, enters a cathode chamber (e.g., a space at least partially defined by a cathode electrode and ribs of an adjacent interconnect), while the fuel, such as hydrogen or hydro-carbon fuel, enters an anode chamber (e.g., a space at least partially defined by the anode electrode and ribs of an adjacent interconnect). Any suitable fuel cell designs and component materials may be used. The system 100 further contains an anode tail gas oxidizer (ATO) reactor 116, a recirculation blower 122, a carbon dioxide separator 326, and an optional membrane humidifier 328.

The system 100 operates according to the following methods. The fuel inlet stream is provided into the fuel cell stack 106 through fuel inlet conduit 102. The fuel may comprise any suitable fuel, such as a hydrogen fuel or a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, hydrogen gas or other mixtures. For example, the mixture may comprise syngas derived from coal or natural gas reformation. The fuel inlet conduit 102 provides the fuel inlet stream to the anode side of the fuel cell stack 106.

Air or another oxygen containing gas is provided into the stack 106 through an air inlet conduit 104. The air inlet conduit 104 provides air to the cathode side of the fuel cell stack 106.

Once the fuel and oxidant are provided into the fuel cell stack 106, the stack 106 is operated to generate electricity and a fuel exhaust stream. The fuel exhaust stream may contain hydrogen, water vapor, carbon monoxide, carbon dioxide, some un-reacted hydrocarbon gas, such as methane, and other reaction by-products and impurities.

The fuel exhaust stream (i.e., the stack anode exhaust stream) is provided from the stack 106 via fuel exhaust conduit 110. The air exhaust stream (i.e., the stack cathode exhaust stream) is provided from the stack air exhaust outlet via air exhaust conduit 112. The fuel exhaust conduit 110 is configured to provide a portion of the fuel exhaust stream to the ATO reactor 116 via ATO input conduit 114 and recycle a portion of the fuel exhaust stream via recycling conduit 120. The portion of fuel exhaust provided to the ATO reactor 116 and recycled via recycling conduit 120 may vary between 10 and 90%. For example, 10% of the fuel exhaust may be provided to the ATO reactor 116 and 90% recycled. Alternatively, 50% of the fuel exhaust may be provided to the ATO reactor 116, while 50% is recycled. Additionally, 90% of the fuel exhaust or more may be provided to the ATO reactor, while 10% or less is recycled. The amount of recycled fuel provided into conduit 120 is controlled by recirculation blower 122 power or blowing speed. The fuel exhaust stream provided into conduits 114 and 120 may contain the same composition or content of hydrogen, carbon monoxide, water, and carbon dioxide. Air exhaust conduit 112 is configured to provide the air exhaust stream to the ATO reactor 116.

The ATO reactor 116 receives the fuel exhaust stream and air exhaust stream via ATO input conduit 114 and conduit 112, respectively. The ATO reactor uses the combined fuel exhaust stream and air exhaust stream to oxidize anode tail gas and output heated oxidized fuel (i.e., reactor exhaust) to ATO exhaust conduit 118.

A recirculation blower 122 is coupled to recycling conduit 120 to provide the recycled fuel exhaust stream from recycling conduit 120 to the $CO_2$ separator 326, via recycling conduit 124. The recirculation blower 122 may be computer or operator controlled and may vary the amount and/or rate of the recycled fuel exhaust stream being provided to the $CO_2$ separator 326 and also the amount and/or rate of the carbon dioxide free or carbon dioxide depleted recycled fuel exhaust stream being provided back to the stack 106. As such, the recirculation blower 122 may be used to increase or decrease the overall recycling rate in system 100.

The carbon dioxide separator 326 may be a carbon dioxide membrane separator according to some embodiments. The system 300 may utilize ATO exhaust or SOFC cathode exhaust to sweep the collection side of the carbon dioxide separator 326 to remove carbon dioxide. The system 100 may bias the carbon dioxide separator 326 collection side gas with water.

The system 100 may utilize ATO exhaust or SOFC cathode exhaust to sweep the collection side of the carbon dioxide separator 326 to remove carbon dioxide. The system 100 and 300 may bias the carbon dioxide separator 326 collection side gas with water.

The recycling conduit 124 may be coupled to the carbon dioxide separator 326. The recycled fuel exhaust stream is input to the carbon dioxide separator 326 via the recycling conduit 124, and carbon dioxide is removed from the recycled fuel exhaust stream to produce a purified (e.g., carbon dioxide depleted) recycled fuel exhaust stream. The purified recycled fuel exhaust stream exiting the carbon dioxide separator 326 contains less carbon dioxide than the recycled fuel exhaust stream that entered the carbon dioxide separator 326 via the recycling conduit 124. As a percentage of overall composition the purified recycled fuel exhaust stream contains a greater percentage of hydrogen than the recycled fuel exhaust stream entering the carbon dioxide separator 326 via recycling conduit 124. Preferably, the carbon dioxide separator 326 removes substantially all the carbon dioxide from the recycled fuel exhaust stream. The carbon dioxide separator 326 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the recycled fuel exhaust stream.

The carbon dioxide separator 326 is coupled to recycling conduit 334. The purified recycled fuel exhaust stream, with a reduced amount of carbon dioxide, is provided back to the fuel inlet stream by the recycling conduit 334. The recycling of reduced carbon dioxide fuel exhaust into the fuel inlet increases the performance of the fuel cell stack 106.

The efficiency of the carbon dioxide separator 326 at selecting for carbon dioxide is increased by the biasing of the collection side of the carbon dioxide separator 326 by adding water to the collection side (e.g., sweep side) of the carbon separator 326.

In one embodiment, the hot exhaust from the ATO reactor 116 is passed via hot exhaust conduit 118 to a cathode recuperator heat exchanger 336 where the ATO exhaust exchanges heat with the air inlet stream provided through air inlet conduit 104. The heat exchanger helps to raise the temperature of the air in air inlet conduit 104 and reduces the temperature of the ATO exhaust in conduit 118 such that it does not damage the membrane humidifier 328.

In an alternative embodiment, all or a portion of the SOFC cathode exhaust may be passed directly to the cathode recuperator heat exchanger 336. A valve 349 may direct cathode exhaust from conduit 112 to conduit 350. Valve 349 may alternatively be a splitter (not shown) configured to direct a portion of the cathode exhaust to conduit 350 and a portion of the cathode exhaust to the ATO reactor. Valve 351 may be configured to direct the cathode exhaust received from conduit 350 toward the cathode recuperator heat exchanger 336 and prevent cathode exhaust from flowing to the ATO reactor 116. Additionally, valve 351 may be coupled to a conduit 352 to direct ATO exhaust and/or SOFC cathode exhaust out of the system 100 as exhaust. The utilization of valves 349 and 351 and conduit 350 may allow either SOFC cathode exhaust or ATO exhaust, a mixture of both ATO exhaust and SOFC cathode exhaust, or neither ATO exhaust nor SOFC cathode exhaust to pass to the cathode recuperator heat exchanger 336.

From the heat exchanger 336, the ATO exhaust conduit 118 may be coupled to a membrane humidifier 328. Air is input to the membrane humidifier 328 via conduit 118. Optionally, air may also be input to the membrane humidifier as via air conduit 340 coupled to the membrane humidifier 328. Air conduit 340 may input air supplied by a blower, fan, or compressor (not shown).

In operation, the membrane humidifier 328 humidifies an air or oxidized fuel stream for input into the carbon dioxide separator 326. The membrane humidifier 328 may comprise a polymeric membrane humidifier.

Water may be input to the membrane humidifier 328 via a water conduit 342 as necessary. Water is also may be collected by the membrane humidifier 328 from the carbon dioxide conduit 332, which is coupled between the carbon dioxide separator 326 and the membrane humidifier 332. The water permeates across the membrane from product side 328B to collection side 328A of membrane humidifier 328. The water from the conduit 342 is mixed in the membrane humidifier 328 with the ATO exhaust from conduit 118 and the now humid air passes to humid air conduit 330.

Humid air conduit 330 is coupled to the carbon dioxide separator 326 and the humid air or ATO exhaust is used to bias the separation of carbon dioxide by the carbon dioxide separator 326. Where a traditional carbon dioxide separator naturally selects for water in a reaction, the presence of water on the sweep side of the carbon dioxide separator reduces the selection of water and increases the efficiency of the carbon dioxide separator to select for carbon dioxide. In this manner the increased amount of water in the air entering the collection side of the carbon dioxide separator 326 biases the carbon dioxide separator 326 to select for carbon dioxide from the recycled fuel exhaust stream. Preferably, the humid air or ATO exhaust contains a substantially equal amount of water as the recycled fuel exhaust stream. The humid air or ATO exhaust may contain about 90%, 80%, 70%, 60%, 50%, 40%, 30%, 20%, or 10% of the water contained in the recycled fuel exhaust stream. The term "about" provides a variation based on given processes variables, such as a variation of 10% or less, preferably 5% or less. The humid air or ATO exhaust may also contain more than 100% of the water contained in the recycled fuel exhaust stream, such as about 110%, 120%, 130%, 140%, 150%, 160%, 170%, 180%, 190%, or 200%.

Thus conduit 330 inputs a humid mix into the collection side 326A and conduit 332 outputs a carbon dioxide and humid mix from the collection side 326A of carbon dioxide separator 326. Conduit 124 inputs the recycled fuel exhaust into the product side 326B and conduit 334 outputs carbon dioxide depleted exhaust from the product side 326B of carbon dioxide separator 326.

Thus, conduits 340 and/or 118 provide an oxidizer to the collection side 328A and conduit 330 outputs a humidified oxidizer from the collections side 328A of membrane humidifier 328. Conduit 332 inputs carbon dioxide and humid mix into product side 328B and conduit 338 outputs carbon dioxide and from the product side 328B.

The humid air or ATO exhaust and carbon dioxide mixture travels from the collection side of the carbon dioxide separator via carbon dioxide conduit 332 to the membrane humidifier 328. The membrane humidifier 328 removes a portion of the water from the humid air mixture, and outputs carbon dioxide and air via output conduit 338. As discussed above, the water removed from the carbon dioxide conduit 332 by the membrane humidifier 328 may be used to humidify air or ATO exhaust entering the membrane humidifier 328. Thus, system 100 uses ATO exhaust or SOFC cathode exhaust to sweep the carbon dioxide separator collection side and/or to bias the collection gas with water.

Figure 2:
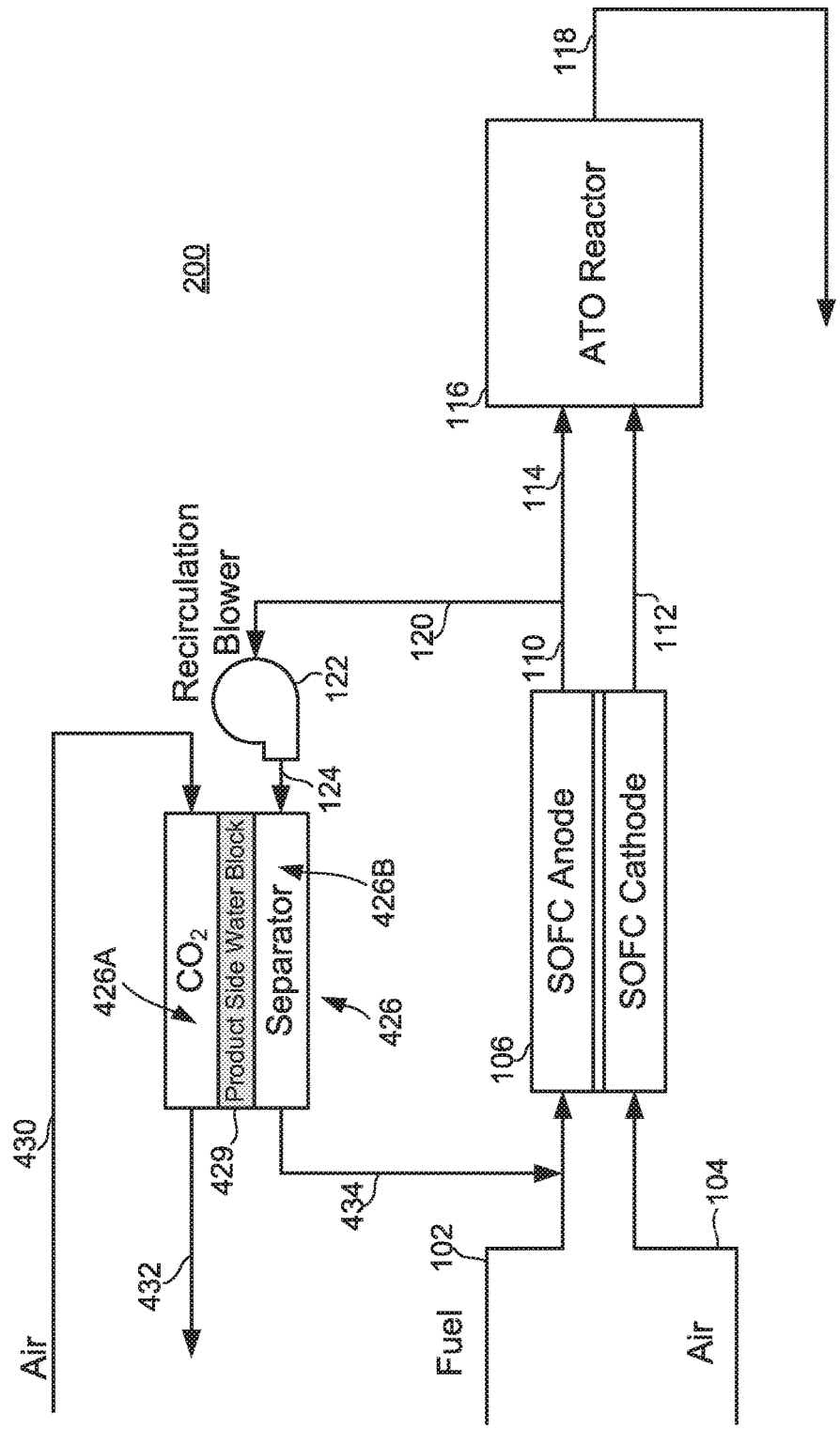

FIG. 2 illustrates a system 200 according to an embodiment of the invention. The system 200 is similar to system 100 illustrated in FIG. 1 and contains a number of components in common. Those components which are common to both systems 100 and 200 are numbered with the same numbers in FIGS. 1 and 2, and will not be described in detail.

One difference between systems 100 and 200 is that system 200 may utilize a different carbon dioxide membrane separator 426. The carbon dioxide membrane separator 426 may be a carbon dioxide membrane separator constructed with tailored membrane structure 429 to block water transport from the product side 426B (i.e., input side or feed side) to the collection side (i.e., sweep side) 426A of the carbon dioxide membrane separator. The tailored membrane structure, (i.e., the product side water block) 429 may be constructed of a material which allows carbon dioxide to pass, but will not allow water to pass. One such material which has been found to be effective for product side water block construction is polytetrafluoroethylene (Teflon®). The product side water block impedes water transport via accumulation or blockage into the purging air of the carbon dioxide membrane separator. The carbon dioxide membrane separator 426 may be constructed in a manner similar to an electrochemical carbon dioxide separator, but does not require the input of electrical current to operate.

Recycling conduit 124 may be coupled to the carbon dioxide membrane separator 426. The recycled fuel exhaust stream enters the product side 426B of the carbon dioxide membrane separator 426 via recycling conduit 124. The carbon dioxide membrane separator removes carbon dioxide from the recycled fuel exhaust stream. As previously discussed, the product side water block 429 of the carbon dioxide membrane separator impedes the transport of water, so only carbon dioxide is collected by the carbon dioxide membrane separator 426 on the collection side 426A. Preferably, the carbon dioxide membrane separator 426 removes substantially all the carbon dioxide from the recycled fuel exhaust stream. The carbon dioxide membrane separator 426 may remove less than 50% or greater than 50%, such as 50% to 60%, 60% to 70%, 70% to 80%, 80% to 90%, or 90% to 100%, such as about 98%, about 99%, or about 99.5% of the carbon dioxide from the recycled fuel exhaust stream.

The purified recycled fuel exhaust stream exiting the product side 426A of the carbon dioxide membrane separator 426 contains less carbon dioxide than the recycled fuel exhaust stream that entered the product side 426B of the carbon dioxide separator 426 via the recycling conduit 124. As a percentage of overall composition the purified recycled fuel exhaust stream contains a greater percentage of hydrogen than the recycled fuel exhaust stream entering the carbon dioxide separator 426 via recycling conduit 124.

The product side 426B of the carbon dioxide membrane separator 426 is coupled to recycling conduit 434. The purified recycled fuel exhaust stream, with a reduced amount of carbon dioxide, is provided back to the fuel inlet stream by the recycling conduit 434. The recycling of reduced carbon dioxide fuel exhaust into the fuel inlet increases the performance of the fuel cell stack 106.

Purge air is provided to the collection side 426A of the carbon dioxide membrane separator 426 via air conduit 430 which is operatively coupled to the collection side 426A of the carbon dioxide membrane separator 426. Purge air removes carbon dioxide from the collection side 426A of the carbon dioxide membrane separator 426. The carbon dioxide membrane separator 426 is operatively coupled to output conduit 432 and the air and carbon dioxide mixture flows from the collection side 426A of the carbon dioxide membrane separator 426 to the output conduit 432.

Figure 3:
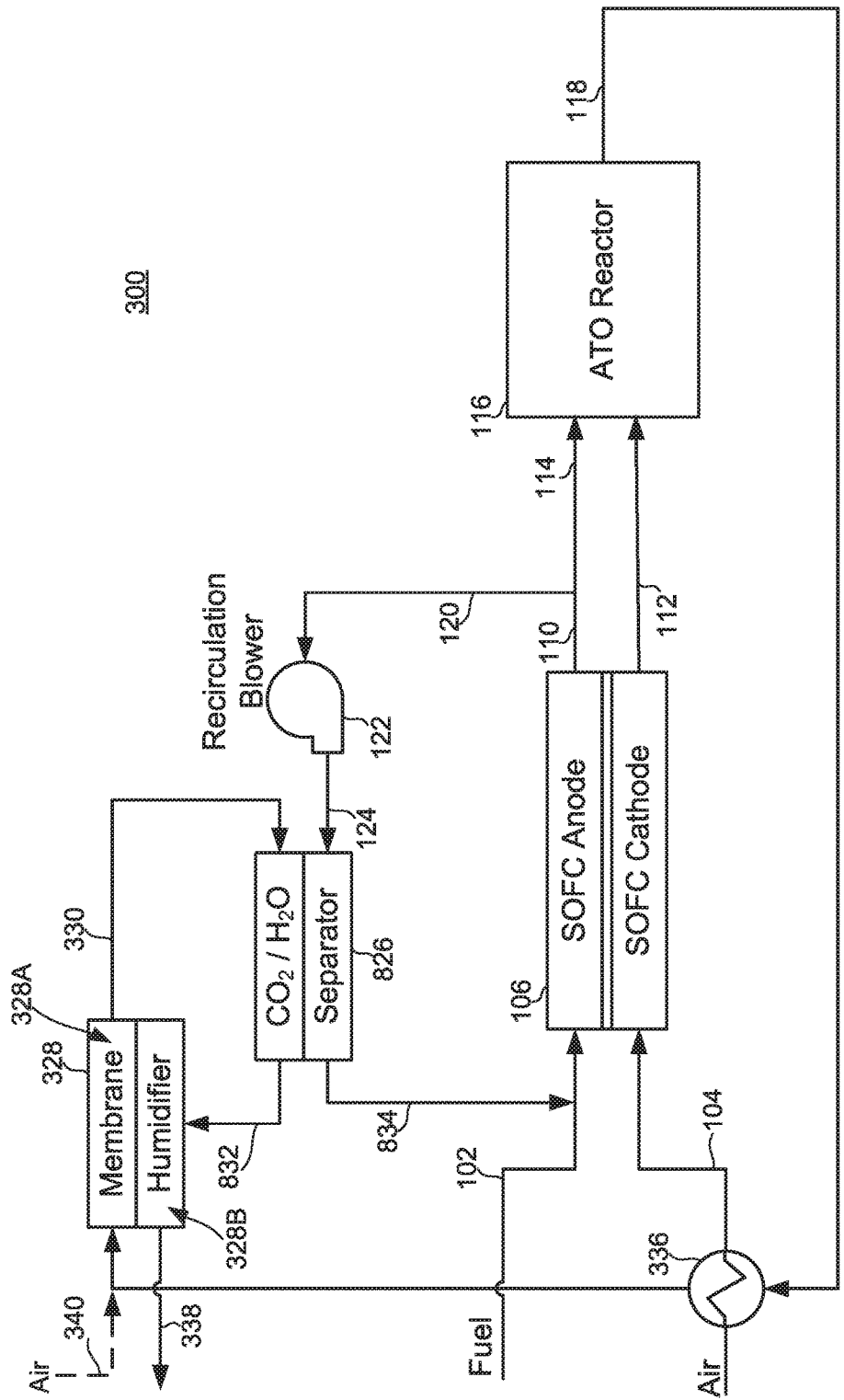

FIG. 3 illustrates a system 300 according to an embodiment of the invention. The system 300 is similar to system 100 illustrated in FIG. 1 and contains a number of components in common. Those components which are common to both systems 100 and 300 are numbered with the same numbers in FIGS. 1 and 3 and will not be described further.

One difference between systems 300 and 100 is that system 300 utilizes a combination carbon dioxide and water separator 826 rather than only a carbon dioxide separator 326. The combination carbon dioxide and water separator 826 operates to produce a purified recycled fuel exhaust stream containing less carbon dioxide and less water to recycle to the fuel cell stack 106, with the carbon dioxide and water are removed at the same time. The combination carbon dioxide and water separator 826 continuously removes carbon dioxide and water from the recycled fuel exhaust stream.

The combination carbon dioxide and water separator 826 receives the recycled fuel exhaust stream via recycling conduit 124. The combination carbon dioxide and water separator 826 removes carbon dioxide and water from the recycled fuel exhaust stream to produce a purified recycled fuel exhaust stream. The purified recycled fuel exhaust stream is passed from combination carbon dioxide and water separator 826 to recycling conduit 834.

The purified recycled fuel exhaust stream exiting the combination carbon dioxide and water separator 826 contains less water than the recycled fuel exhaust stream that entered the combination carbon dioxide and water separator 826 via recycling conduit 124. Compared to the fuel exhaust stream originally exiting the fuel cell stack 106 via fuel exhaust conduit 110, the purified recycled fuel exhaust stream exiting the combination carbon dioxide and water separator 826 via recycling conduit 834 contains less water and less carbon dioxide overall. The removal of carbon dioxide and water results in the purified recycled fuel exhaust stream in recycling conduit 828 having an increased proportion of both hydrogen and carbon monoxide as a percentage of volume when compared to the fuel exhaust stream originally exiting the fuel cell stack 106 via the fuel exhaust conduit 110.

The purified recycled fuel exhaust stream exits the combination carbon dioxide and water separator 826 via recycling conduit 834 and the purified recycled fuel exhaust stream is provided back to the fuel inlet stream by the recycling conduit 834. The recycling of reduced carbon dioxide fuel exhaust into the fuel inlet increases the performance of the fuel cell stack 106 and the reduction of water optimizes the steam to carbon ratio and increases cell performance.

The water and carbon dioxide removed from the combination carbon dioxide and water separator 826 mixes with purge air received from humid air conduit 330 and exits the combination carbon dioxide and water separator 826 via carbon dioxide conduit 832. The membrane humidifier 328 removes water from the carbon dioxide, water, and air mixture received via carbon dioxide conduit 832. The water removed by the membrane humidifier 328 may be used to humidify the input air to the membrane humidifier 328. In this manner, the need for water conduit 342 present in system 300 may be eliminated.

Figure 4:
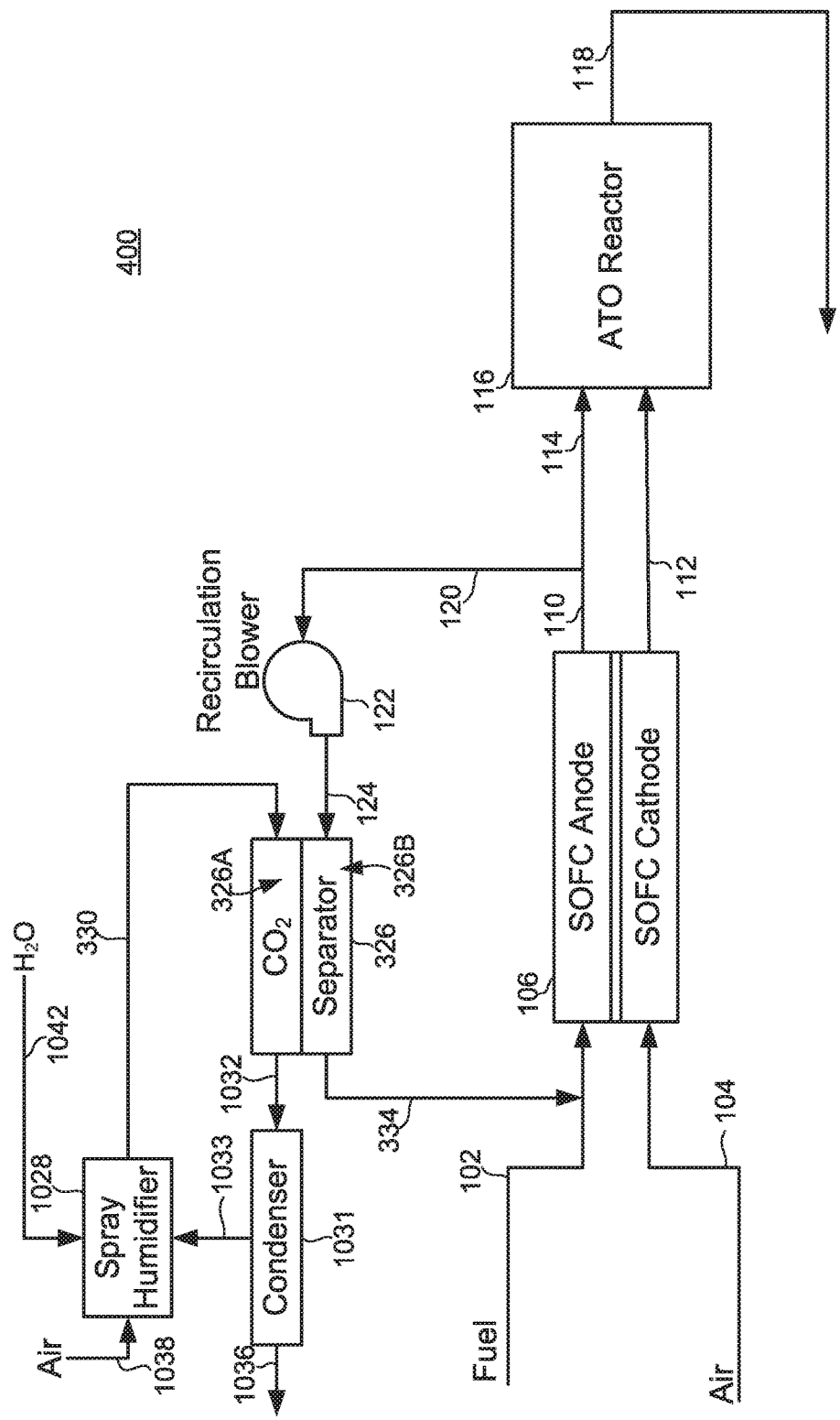

FIG. 4 illustrates a system 400 according to an embodiment of the invention. The system 400 is similar to system 100 illustrated in FIG. 1 and contains a number of components in common. Those components which are common to both systems 100 and 400 are numbered with the same numbers in FIGS. 1 and 4 and will not be described further.

One difference between systems 100 and 400 is that system 400 utilizes spray humidifier 1028 to bias carbon dioxide separator 326 by adding water to the collection side 326A of the carbon dioxide separator 326, rather than the membrane humidifier 328 of system 300. Additionally, in system 400 the air conduit 118 need not be connected to the spray humidifier 1042. The spray humidifier 1028 is used to add water to the air that will be input to the collection side 326A of the carbon dioxide separator 326.

Air is input to the spray humidifier 1028 via air conduit 1038. Water may be input to the spray humidifier 1028 via a water conduit 1042. Water may also be input to the spray humidifier via water conduit 1033. Water is sprayed into the air input into the spray humidifier 1028 and mixes with the air to produce humid air. The now humid air passes to humid air conduit 330.

Humid air conduit 330 is coupled to the collection side 326A of the carbon dioxide separator 326 and the humid air is used to bias the separation of carbon dioxide by the carbon dioxide separator 326. Where a traditional carbon dioxide separator naturally selects for water in a reaction, the presence of water on the collection side of the carbon separator reduces the selection of water and increases the efficiency of the carbon dioxide separator to select for carbon dioxide. In this manner the increase amount of water in the air entering the carbon dioxide separator 326 biases the collection side 326A of the carbon dioxide separator 326 to select for carbon dioxide from the recycled fuel exhaust stream.

The humid air and carbon dioxide mixture travels from the carbon dioxide separator via carbon dioxide conduit 1032 to a condenser 1031. The condenser 1031 removes a portion of the water from the humid air and carbon dioxide mixture, and outputs carbon dioxide and air via output conduit 1036. The water collected in the condenser 1031 may be provided to water conduit 1033 and input to the spray humidifier 1028.

Figure 5:
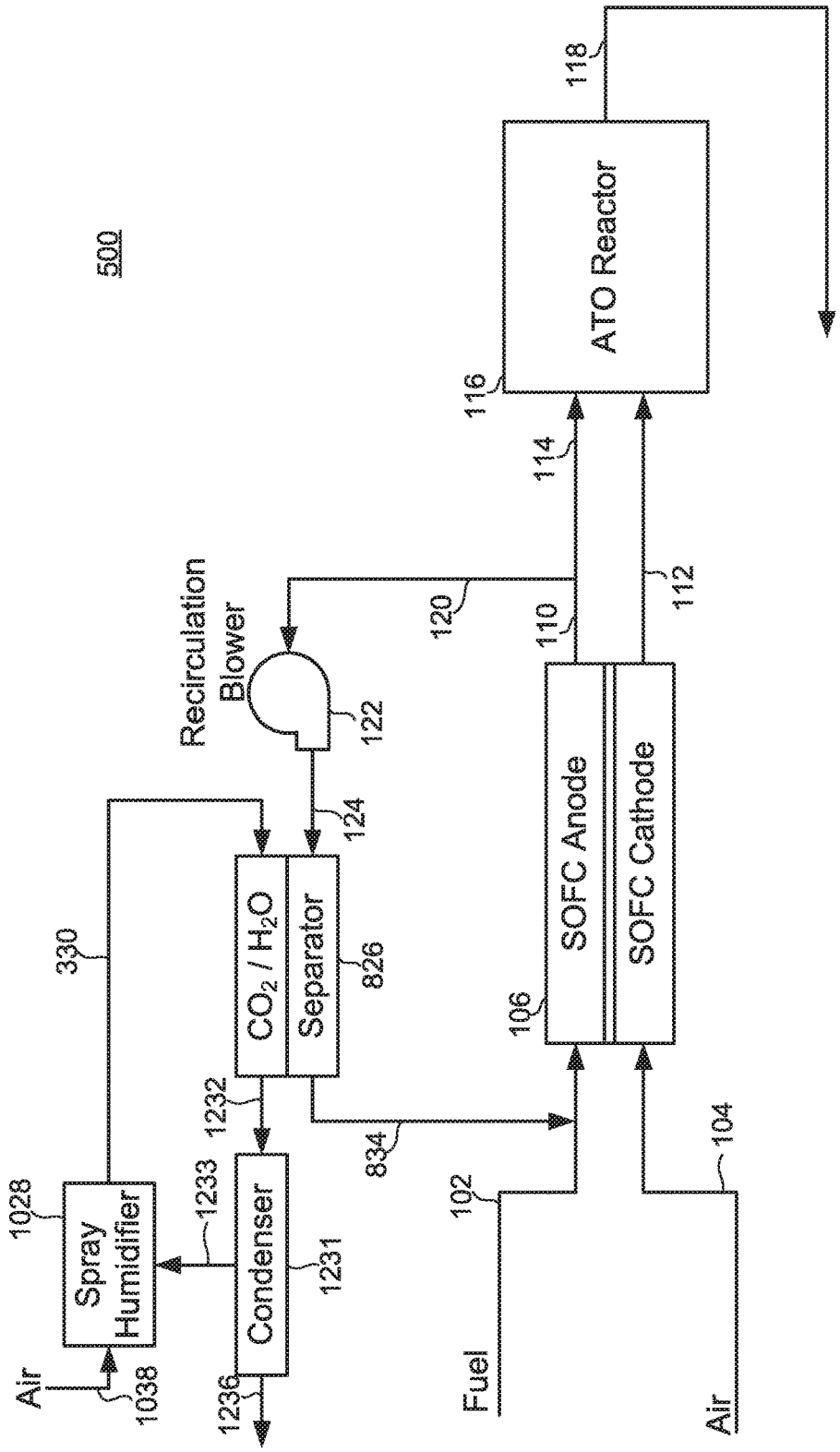

FIG. 5 illustrates a system 500, according to an embodiment of the invention. The system 500 is similar to system 300 illustrated in FIG. 3 and contains a number of components in common. Those components which are common to both systems 500 and 300 are numbered with the same numbers in FIGS. 3 and 5 and will not be described further.

One difference between systems 300 and 500 is that system 500 utilizes spray humidifier 1028 to bias the combination carbon dioxide and water separator 826 by adding water to the collection side of the combination carbon dioxide and water separator 826, rather than utilizing the membrane humidifier 328 of system 300. Additionally, in system 500 the air conduit 118 need not be connected to the spray humidifier 1028. System 500 is a combination of systems 300 and 400 in that it contains the combination carbon dioxide and water separator 826 and the spray humidifier 1028. The spray humidifier 1028 is used to add water to the air that will be input to the collection side of the carbon dioxide separator 826.

The water and carbon dioxide removed from the combination carbon dioxide and water separator 826 mixes with purge air received from humid air conduit 330 and exits the combination carbon dioxide and water separator 826 via carbon dioxide conduit 1232.

Air is input to the spray humidifier 1028 via air conduit 1038. Water may be input to the spray humidifier 1028 via a water conduit 1233. Water is sprayed into the air input into the spray humidifier 1028 and mixes with the air to produce humid air. The now humid air passes to humid air conduit 330 to be provided to the collection side of the carbon dioxide and water separator 826.

The humid air and carbon dioxide mixture travels from the combination carbon dioxide and water separator 826 via carbon dioxide conduit 1232 to a water separator, such as the condenser 1231. The condenser 1231 removes a portion of the water from the humid air and carbon dioxide mixture, and outputs carbon dioxide and air via output conduit 1236. The water collected in the condenser 1231 may be provided to water conduit 1233 and input to the spray humidifier 1028.

Figure 6:
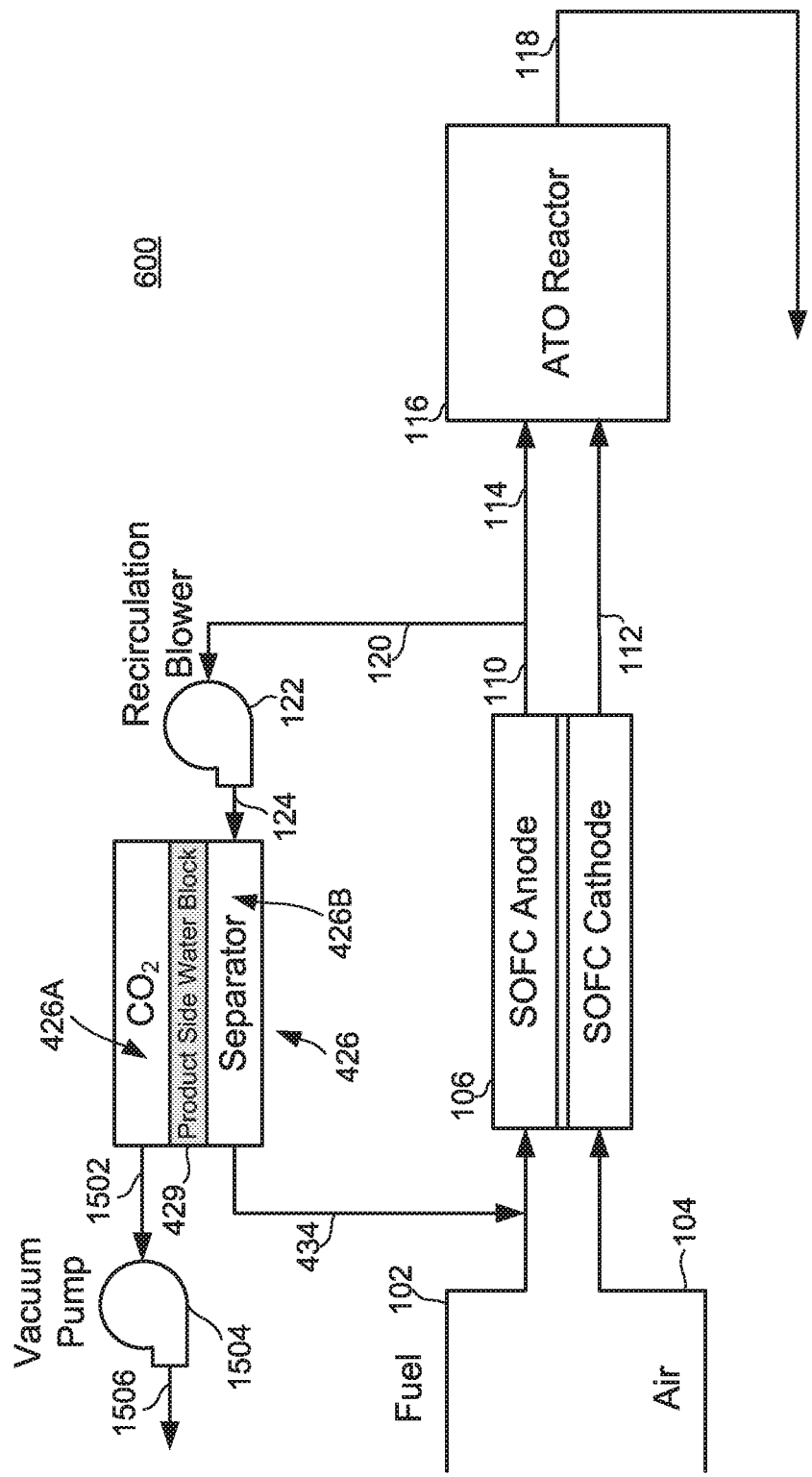

FIG. 6 illustrates a system 600 according to an exemplary embodiment of the invention. The system 600 is similar to system 200 illustrated in FIG. 2 and contains a number of components in common. Those components which are common to both systems 200 and 600 are numbered with the same numbers in FIGS. 2 and 6 and will not be described further.

One difference between systems 200 and 600 is that system 600 utilizes a vacuum pump 1504 to remove separated carbon dioxide from the collection side 426A of the carbon dioxide membrane separator 426 rather than purge air. The utilization of a vacuum pump 1504 may be more effective than purge air, and the parasitic power draw of the vacuum pump 1504 may not be so large as to overcome the benefit of using the vacuum pump 1504. An output conduit 1502 may be operatively connected to the collection side 426A of the carbon dioxide membrane separator 426. The output conduit 1502 may be operatively connected to the vacuum pump 1504. An output conduit 1506 may be coupled to the vacuum pump 1504. In operation, the vacuum pump 1504 may pull carbon dioxide from the collection side 426A of the carbon dioxide membrane separator 426 via output conduit 1502.

In alternative embodiments (not shown) nitrogen, steam, or argon rather than air may be used as the purge gas for carbon dioxide separators. Oxygen could be removed by injecting a small amount of waste fuel (carbon-free and including $H_2$, such as forming gas mixture of $N_2$ and $H_2$ gas) into the sweep air stream and burning it, removing substantially all the oxygen. However, depending on the fuel source chosen and the system design, this strategy may not always be beneficial since more fuel might be consumed than is reclaimed. Oxygen could also be removed with an electrochemical cell ("oxygen pumping") with an oxide ion electrolyte and oxidation tolerant electrodes such as Pt. Alternative waste streams could also be used, such as oxygen-depleted air from the cathode exhaust of the fuel cell.

Figure 7:
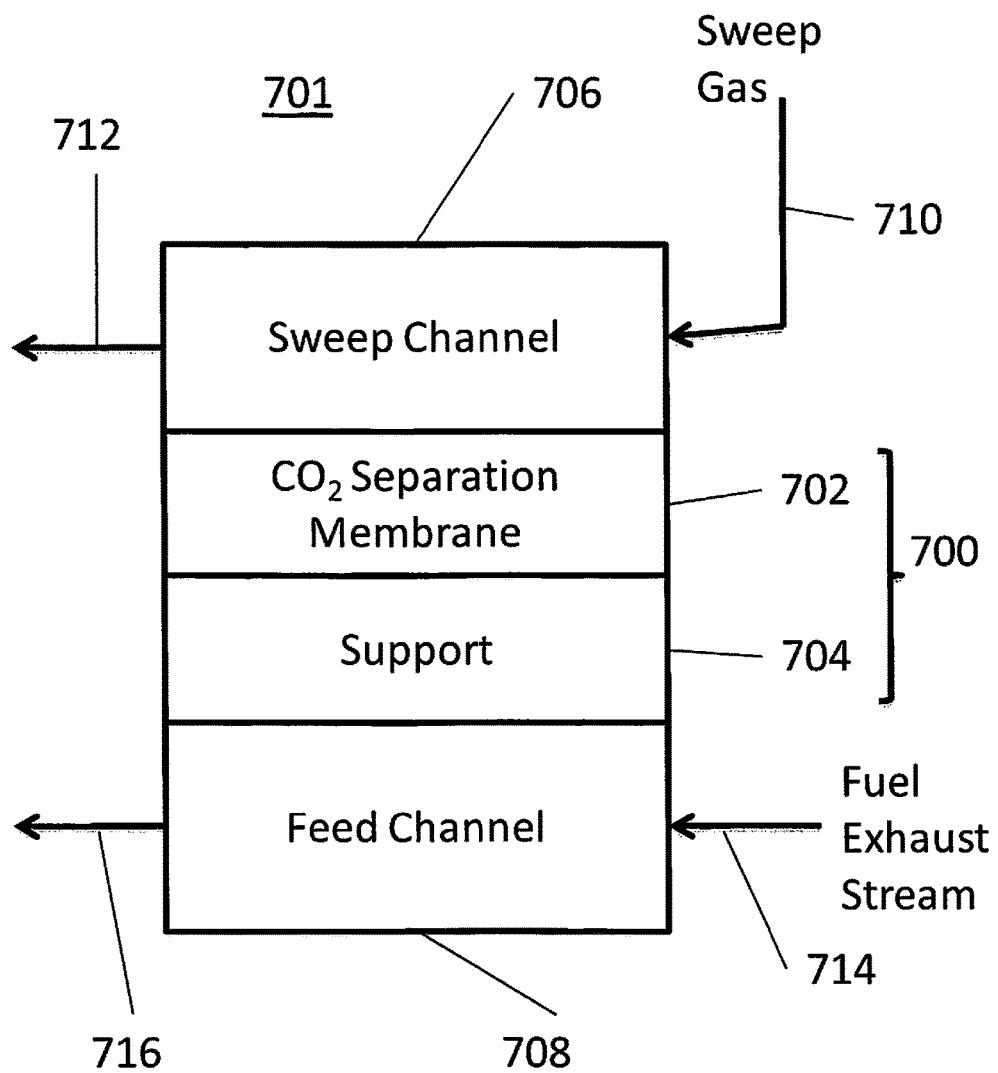
FIG. 7 is a schematic of a carbon dioxide separator capable of use with various embodiments the present invention.

FIG. 7 illustrates a carbon dioxide separator 701, according to an exemplary embodiment of the present invention. The carbon dioxide separator 701 includes a sweep channel 706, a feed channel 708, and membrane structure 700 disposed therebetween. A sweep gas is supplied to the sweep channel 706 through a sweep gas supply conduit 710. The sweep gas supply conduit may also be referred to as an air conduit. The sweep gas is exhausted from the sweep channel 706 through a sweep gas exhaust conduit 712. The sweep gas exhaust conduit may also be referred to as a carbon dioxide conduit.

A fuel exhaust stream is supplied to the feed channel 708 through a first recycling conduit 714. The fuel exhaust stream is exhausted from the feed channel 708 through a second recycling conduit 716. The second recycling conduit 716 may be connected to a fuel inlet conduit connected to a fuel cell stack, as described above.

The carbon dioxide separator 701 may be used as one of the above carbon dioxide membrane separators, such as the carbon dioxide separator 326 shown in FIG. 1. Referring to FIG. 7, the membrane structure 700 includes a carbon dioxide separation membrane 702. The carbon dioxide separation membrane 702 should be permeable to $CO_2$ and optionally to $H_2O$, and impermeable, or substantially impermeable, to $H_2$, CO, and $N_2$. In other words, carbon dioxide separation membrane 702 may have a relatively high permeability to $CO_2$ and optionally to $H_2O$, and a relatively low permeability to $H_2$, CO, and $N_2$. Exemplary embodiments of the carbon dioxide separation membrane 702 and methods of forming the same are discussed in detail below.

The membrane structure 700 also includes an optional support 704. In FIG. 7, the support 704 is shown to be disposed between the carbon dioxide separation membrane 702 and the feed channel 708. However, according to some embodiments, the support 704 may be disposed between the carbon dioxide separation membrane 702 and the sweep channel 706. In addition, according to other embodiments, the support 704 may be omitted.

The support 704 should be porous and should not change its physical or chemical properties at operating temperatures ranging from about 70° C. to about 150° C., from about 80° C. to about 100° C., from about 100° C. to about 140° C., or from about 130° C. to about 140° C. The support 704 should be non-reactive with the carbon dioxide separation membrane 702 at these operating temperatures. Further, the support 704 should have a substantially uniform thickness. The support 704 may have an average pore size ranging from 40-90 µm, in order to facilitate sequential solvent exchange.

The support 704 may include a porous polymer material, such as a polysulfone-based material. For example, the support 704 may include polysulfone and polyvinylpyrrolidone (PVP). In some embodiments, the support may include polysulfone and PVP at a weight ratio of about 1:1 to about 2:1, such as about 3:2.

According to various embodiments, the membrane 702 may be configured to operate at temperatures of from about 70° C. to about 150° C., from about 80° C. to about 100° C., from about 100° C. to about 140° C., or from about 130° C. to 140° C. The membrane 702 may include poly vinyl alcohol (PVA) as a base polymer and a carrier, such as an amine-based carrier. The membrane 702 may also include a cross-linker, in addition to the PVA and the carrier. When a cross-linker is not included, the carrier may operate as a PVA cross-linker.

The PVA may be cross-linked, such that the PVA is substantially or completely insoluble in water. The cross-linking may also improve the thermal and mechanical stability of the membrane 702. In particular, the cross-linking allows the membrane 702 to operate at temperatures ranging from about 80 to 150° C. However, excessive cross-linking may impart brittleness and reduce $CO_2$ permeation. Accordingly, from about 15% to about 30% of the PVA monomers may be cross-linked (with a remaining about of the PVA remaining uncross-linked). According to some embodiments, from about 20% to about 25% of the PVA monomers may be cross-linked.

The carrier may be selected from one or more of: poly aniline (PANI); sulfosuccinic acid; diethylenetriamine (DETA); imidazole; benzimidazole; diethanolamine (DEA); glycine; and combinations thereof. According to some embodiments, the carrier may be selected from: poly PANI; sulfosuccinic acid; DETA; imidazole; benzimidazole; DEA; DEA and glycine; and DETA and imidazole.

The cross-linker may be selected from: formaldehyde; DETA; potassium hydroxide; gultaraldehyde, and combinations thereof. According to some embodiments, the cross-linker may be selected from: formaldehyde; DETA and formaldehyde; potassium hydroxide and formaldehyde; and gultaraldehyde and potassium hydroxide.

According to various embodiments, the membrane 702 may have a PVA to carrier mol ratio ranging from about 5:1 to about 10:1. However, when the membrane 702 includes a polymer carrier, such as PANI, the membrane 702 may have a PVA to carrier mol ratio ranging from about 275:1 to about 325:1. In particular, the membrane 702 may have a PVA to polymer carrier mol ratio of about 300:1.

According to various embodiments, the membrane 702 may be represented by one of the following Chemical Formulas 1-9:

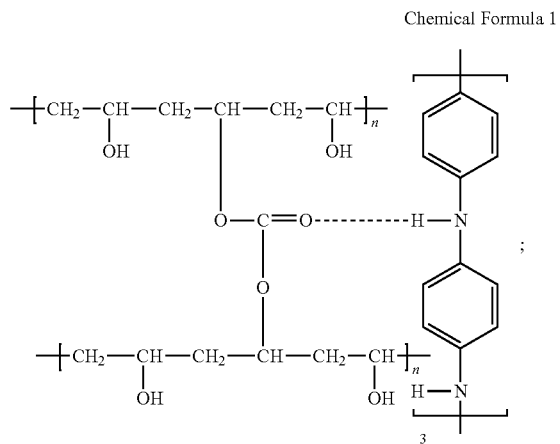

Chemical Formula 1

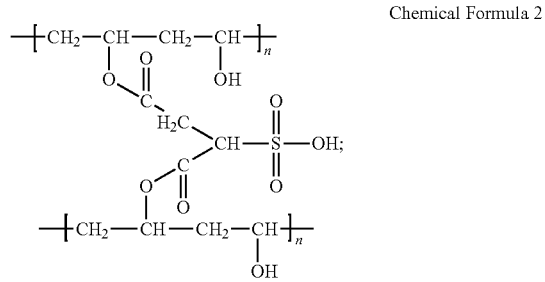

Chemical Formula 2

Chemical Formula 3
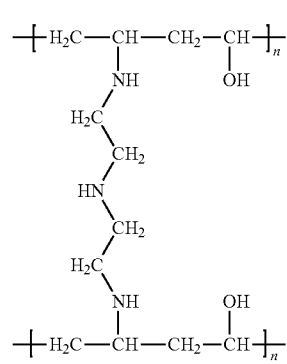
Chemical Formula 4
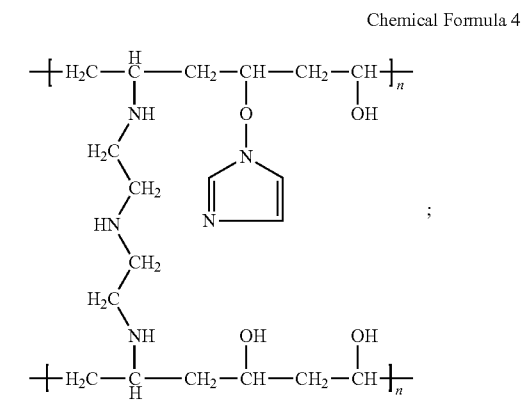
Chemical Formula 5
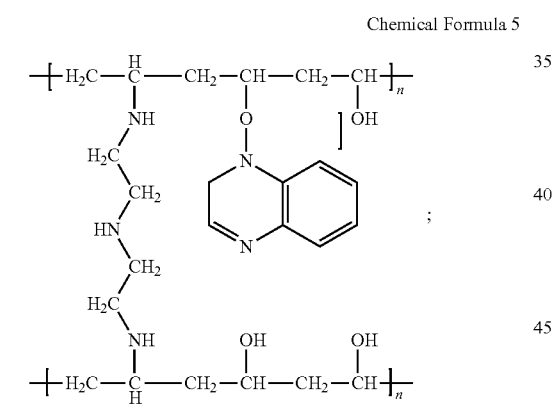
Chemical Formula 6
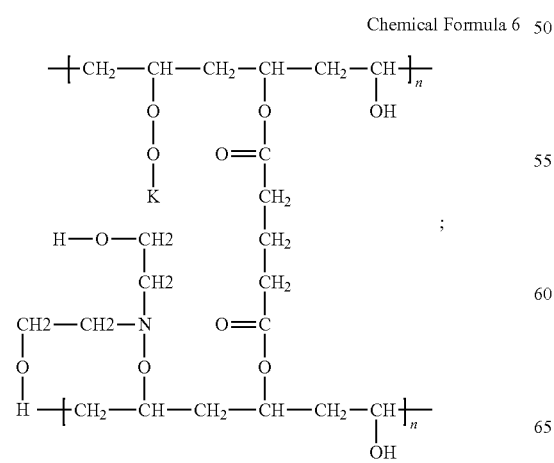
Chemical Formula 7
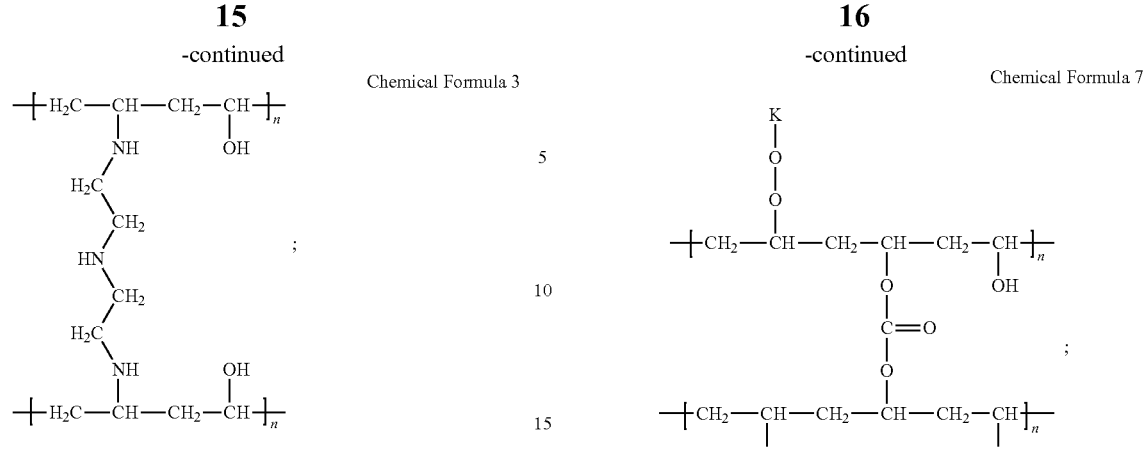
Chemical Formula 8
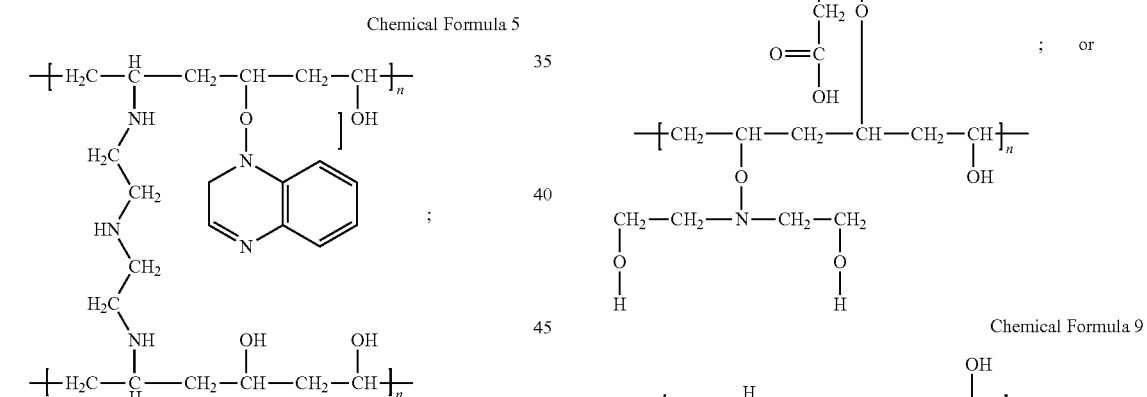
Chemical Formula 9
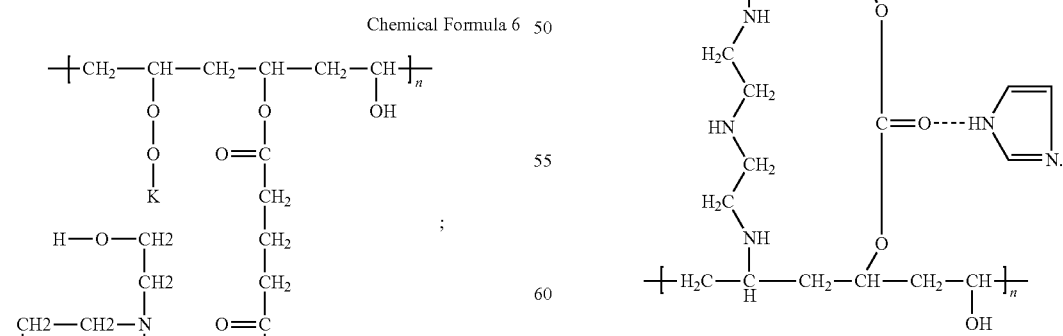
In Chemical Formulas 1-9, "n" is a number ranging from 2700 to 3000, and "m" is a number ranging from 155 to 175. For example, n may be about 2840, and m may be about 164, according to some embodiments.

According to various embodiments, the membrane 702 may be exemplified by any of the membranes included in the following Table 1. Table 1 includes Membranes A-C, E-G, G2, G3, and E3, and corresponding carriers and cross-linkers. Membranes A-C, E-G, G2, G3, and E3 may respectively correspond to Chemical Formulas 1-9. The membranes can be used to separate $CO_2$ selectively from an anode re-cycle feed stream of a fuel cell, such as a solid oxide fuel cell (SOFC) stack.

TABLE 1

| Membrane Name | Base Polymer | Carrier | Cross-Linker/ Initiator |
|---|---|---|---|
| Membrane A | PVA | Polyaniline (PANI) | Formaldehyde |
| Membrane B | PVA | Sulfosuccinic Acid | Sulfosuccinic Acid |
| Membrane C | PVA | Diethylenetriamine (DETA) | DETA |
| Membrane E | PVA | Imidazole | DETA |
| Membrane F | PVA | Benzimidazole | DETA |
| Membrane G | PVA | Diethanolamine (DEA) | Potassium Hydroxide (KOH) Gultaraldehyde |
| Membrane G2 | PVA | DEA | KOH Formaldehyde |
| Membrane G3 | PVA | DEA and Glycine | KOH Formaldehyde |
| Membrane E3 | PVA | DETA and Imidazole | KOH Formaldehyde |

Solution Preparation Procedures

Figure 8:
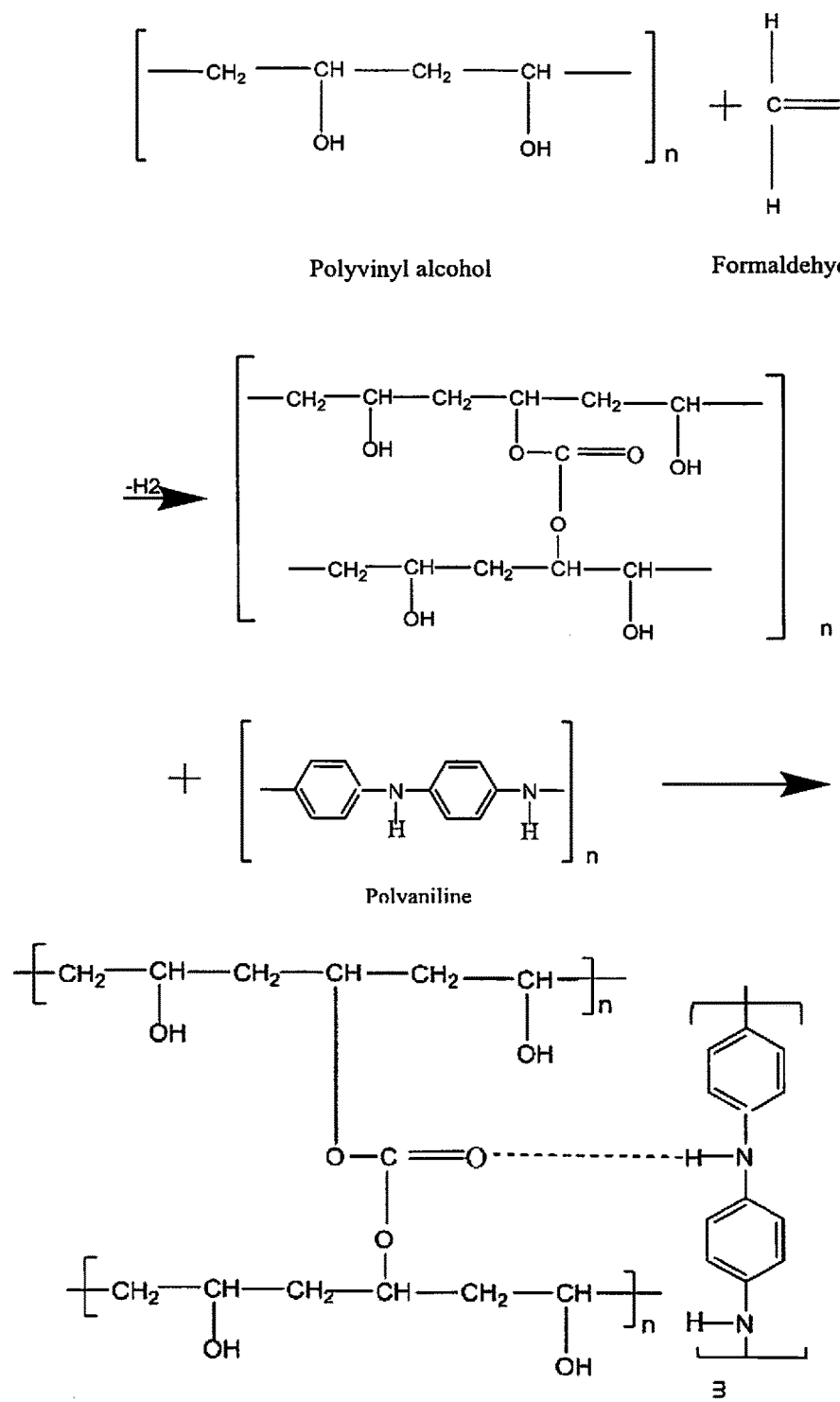
FIG. 8 illustrates a reaction mechanism of a method of forming Membrane A.

FIG. 8 illustrates a reaction mechanism of a method of forming a casting solution for Membrane A, wherein weight percentages are based on the weight of PVA. Referring to FIG. 8, Ig of PVA is dissolved in 9 ml of formic acid with constant stirring for 6 hours, at room temperature, to form a PVA solution. A 2 wt % polyaniline (PANI) solution is constantly stirred for 6 hours, at room temperature, to form a PANI dispersion solution (the PANI did not dissolve).

The PANI dispersion solution is added to the PVA solution with stirring, at room temperature. 12 wt % of formaldehyde is then added to the resultant solution as cross-linker, in an amount sufficient for 20% cross-linking. The solution is kept under constant stirring for 24 hours, at room temperature. The viscosity of the solution may be increased, if necessary, by placing the solution in oven at 60° C., to achieve a viscosity of about 15000 to about 20000 cp. The solution may then be filtered and sonicated for about 10 minutes, to remove bubbles from the solution. The duration of the sonication may be increased if bubbles persist. After sonication, the casting solution for Membrane A is complete.

Figure 9:
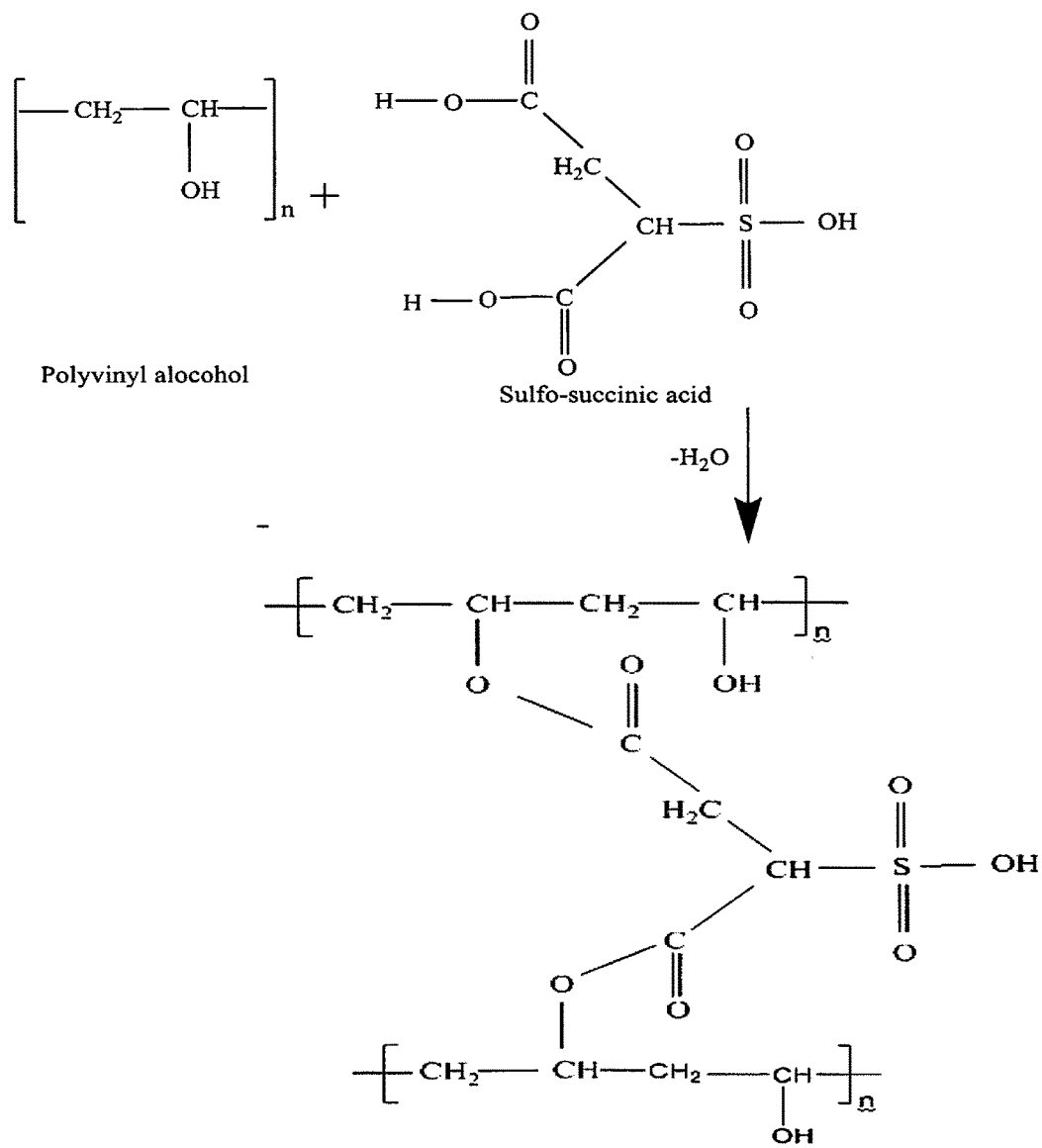
FIG. 9 illustrates a reaction mechanism of a method of forming Membrane B.

FIG. 9 illustrates a reaction mechanism of a method of forming a casting solution for Membrane B, wherein weight percentages are based on the weight of PVA. Referring to FIG. 9, Ig PVA is added to 9 ml of water with constant stirring at 80° C., for 6 hours. 1.3 ml of a 10 wt % sulfo-succinic acid (SSA) solution is added, via drop-wise addition, to the PVA solution under constant stirring, at room temperature. The stirring is continued for about 24 hours.

The viscosity of the solution may be increased, if necessary, by placing the solution in oven at 60° C., to achieve a viscosity of about 15000 to about 20000 cp. The solution may then be filtered and sonicated for about 10 minutes, to remove bubbles from the solution. The duration of the sonication may be increased if bubbles persist. After sonication, the casting solution for Membrane B is complete.

Figure 10:
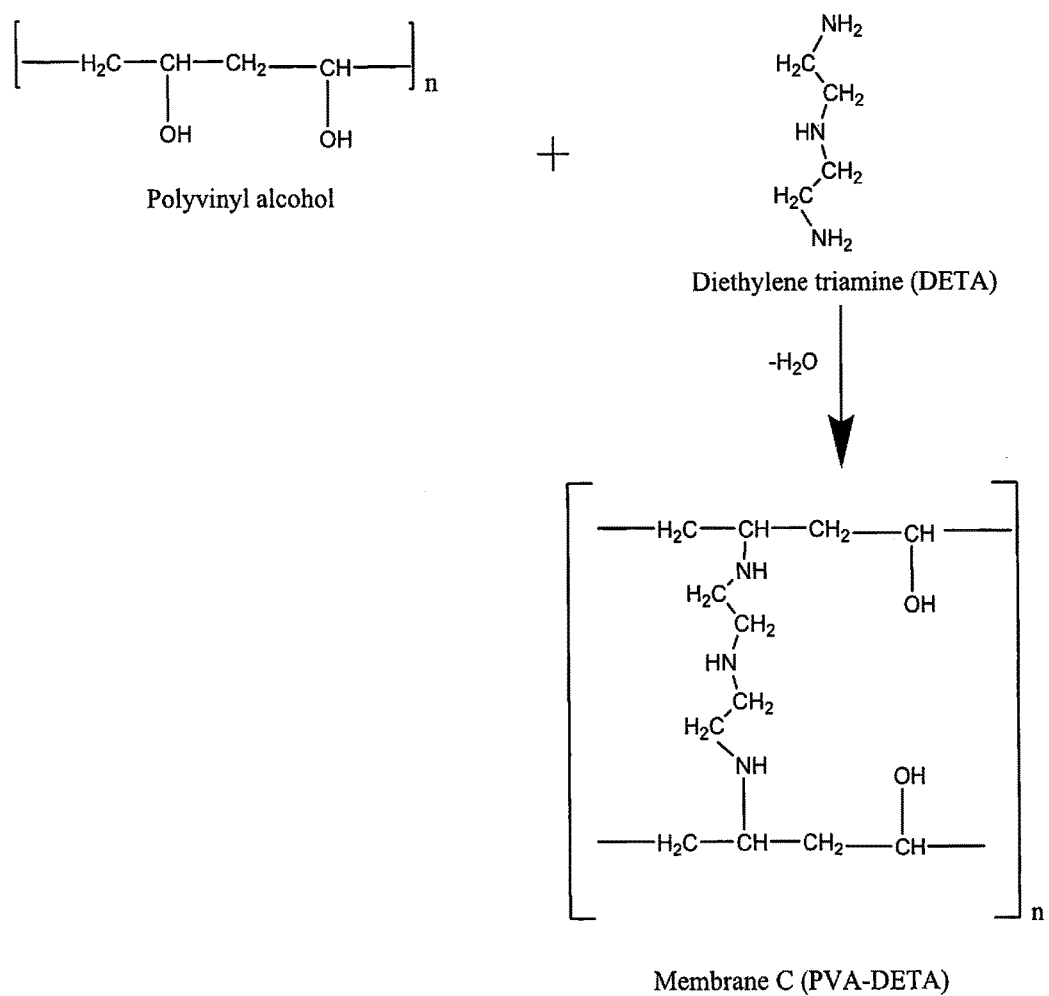
FIG. 10 illustrates a reaction mechanism of a method of forming Membrane C.

FIG. 10 illustrates a reaction mechanism of a method of forming a casting solution for Membrane C, wherein weight percentages are based on the weight of PVA. Referring to FIG. 10, Ig PVA is added to 9 ml of water with constant stirring at 80° C., for 6 hours. The PVA solution is brought to room temperature. Then, 0.5 ml of diethylenetriamine (DETA) is added to the PVA, followed by stirring. The DETA is sufficient to cross-link about 20% of the PVA monomers. The solution is kept under constant stirring for 24 hours, at room temperature.

The viscosity of the solution may be increased, if necessary, by placing the solution in oven at 60° C., to achieve a viscosity of about 15000 to about 20000 cp. The solution may then be filtered and sonicated for about 10 minutes, to remove bubbles from the solution. The duration of the sonication may be increased if bubbles persist. After sonication, the casting solution for Membrane C is complete.

Figure 11:
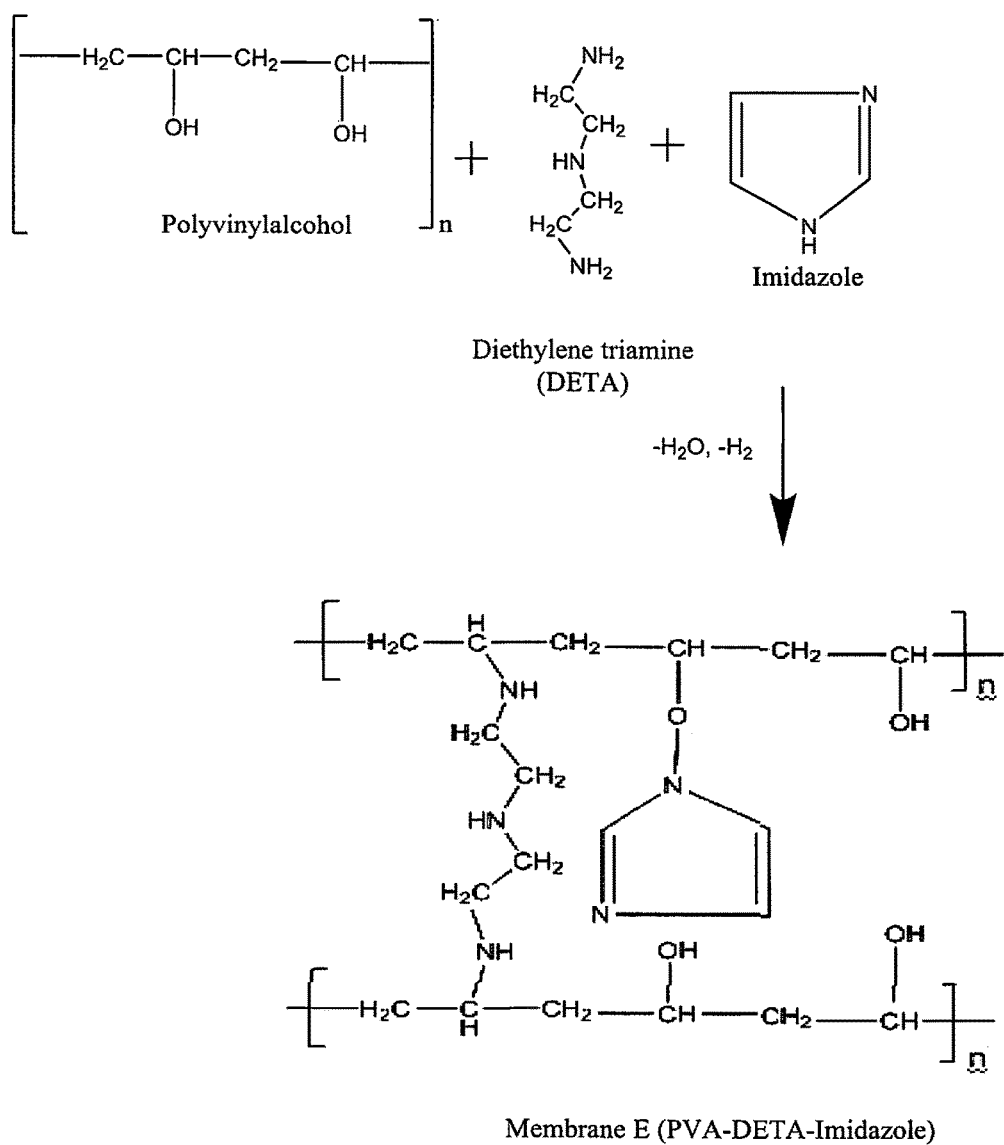
FIG. 11 illustrates a reaction mechanism of a method of forming Membrane E.

FIG. 11 illustrates a reaction mechanism of a method of forming a casting solution for Membrane E, wherein weight percentages are based on the weight of PVA. Referring to FIG. 11, 15 g of PVA is dissolved in 135 ml of water with constant stirring at 80° C., for 6 hours, and then allowed to cool overnight. 9.3 ml of DETA is added to the cooled PVA solution, and the mixture is stirred for 10 minutes, resulting in a PVA/DETA solution.

3.7 g of imidazole is added to 17 ml water and then stirred to produce an imidazole solution. The imidazole solution and the PVA/DETA solution are mixed and then stirred for 24 hours, while heated at 60° C. The resultant solution is covered with aluminum foil having 0.2 cm holes and then heated in an oven at 60° C., for 72 hours, to achieve a viscosity of about 15000 to about 20000 cp. The solution may then be filtered and sonicated for about 10 minutes, to remove bubbles from the solution. The duration of the sonication may be increased if bubbles persist. After sonication, the casting solution for Membrane E is complete.

Figure 12:
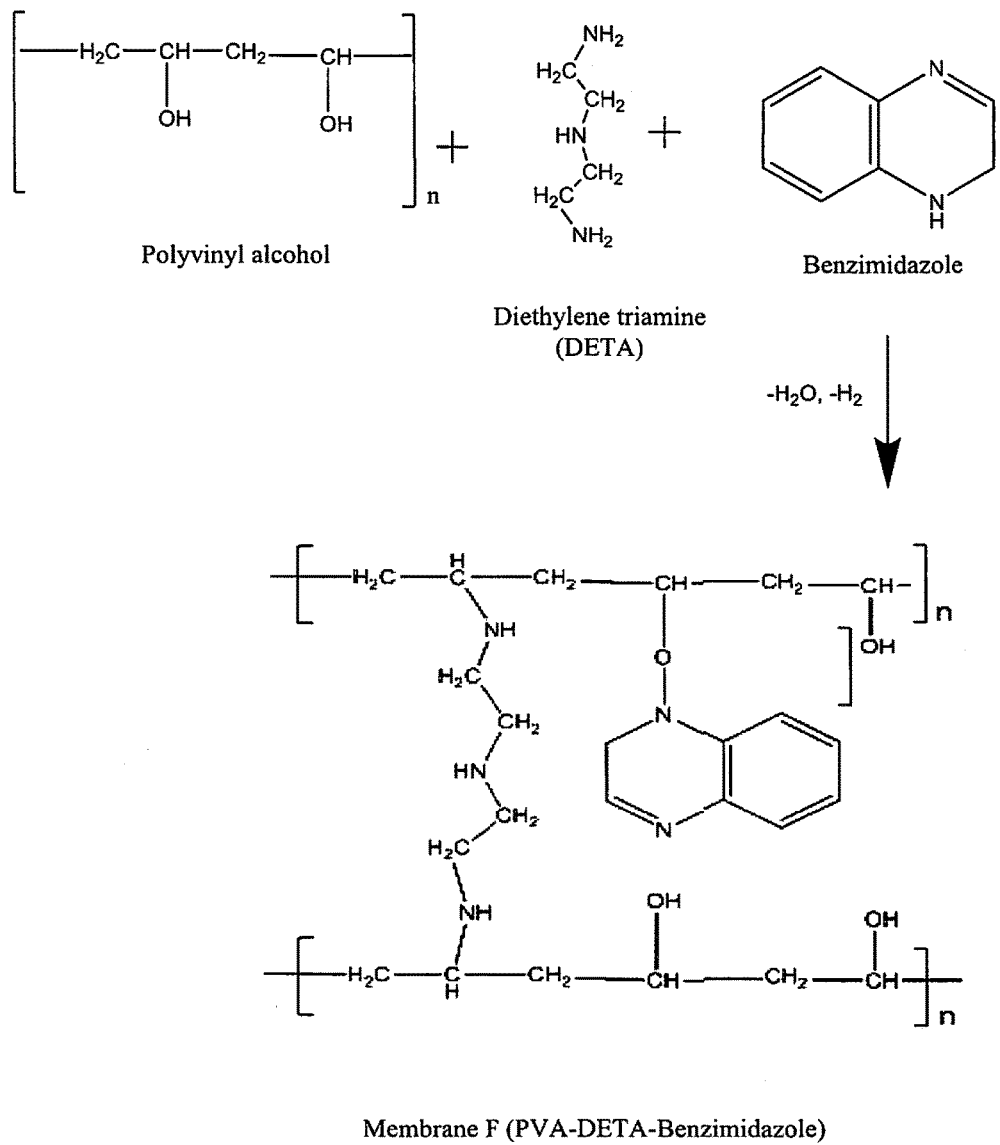
FIG. 12 illustrates a reaction mechanism of a method of forming Membrane F.

FIG. 12 illustrates a reaction mechanism of a method of forming a casting solution for Membrane F, wherein weight percentages are based on the weight of PVA. Referring to FIG. 12, Ig PVA is added to 9 ml of water with constant stirring at 80° C., for 6 hours. 10 wt % of a benzimidazole solution is prepared in an acetone solvent. The benzimidazole solution is then added to the PVA solution with stirring. 0.5 ml of DETA is added to the PVA/benzimidazole solution, followed by stirring for 24 hours, at room temperature.

The viscosity of the solution may be increased, if necessary, by placing the solution in oven at 60° C., to achieve a viscosity of about 15000 to about 20000 cp. The solution may then be filtered and sonicated for about 10 minutes, to remove bubbles from the solution. The duration of the sonication may be increased if bubbles persist. After sonication, the casting solution for Membrane F is complete.

Figure 13A:
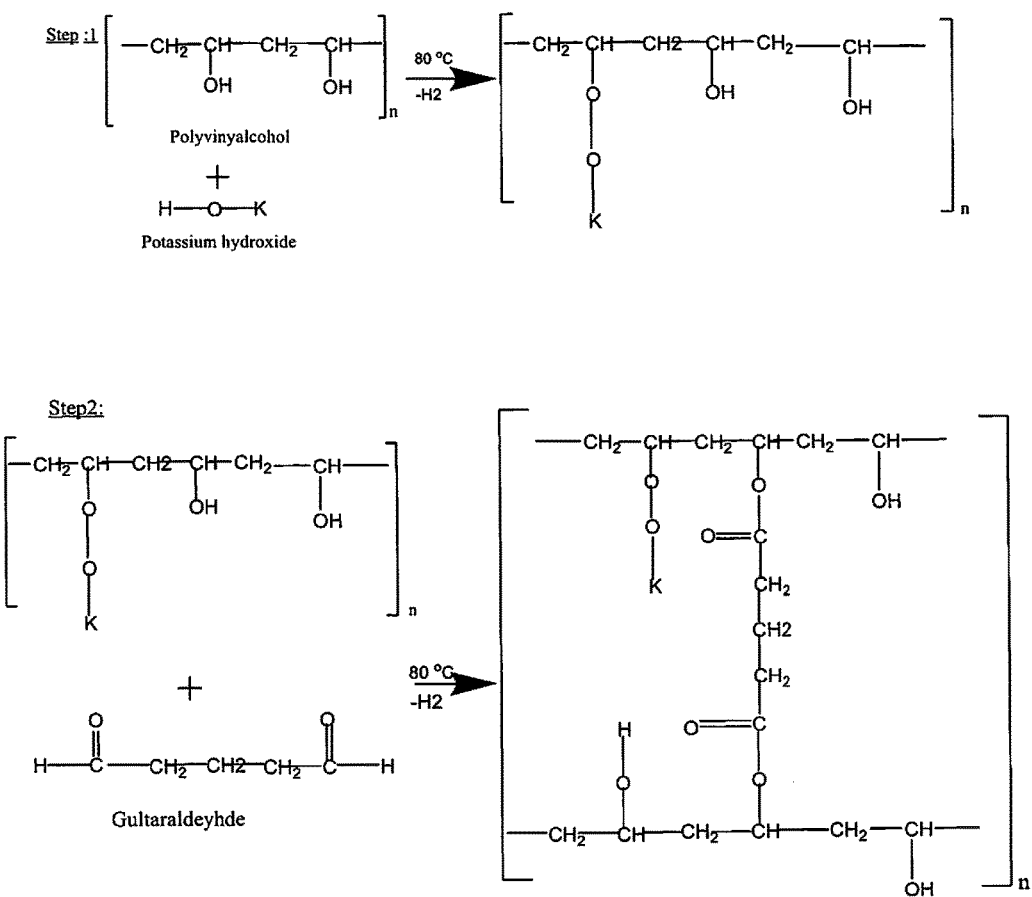
FIGS. 13A and 13B illustrate a reaction mechanism of a method of forming Membrane G.
Figure 13B:
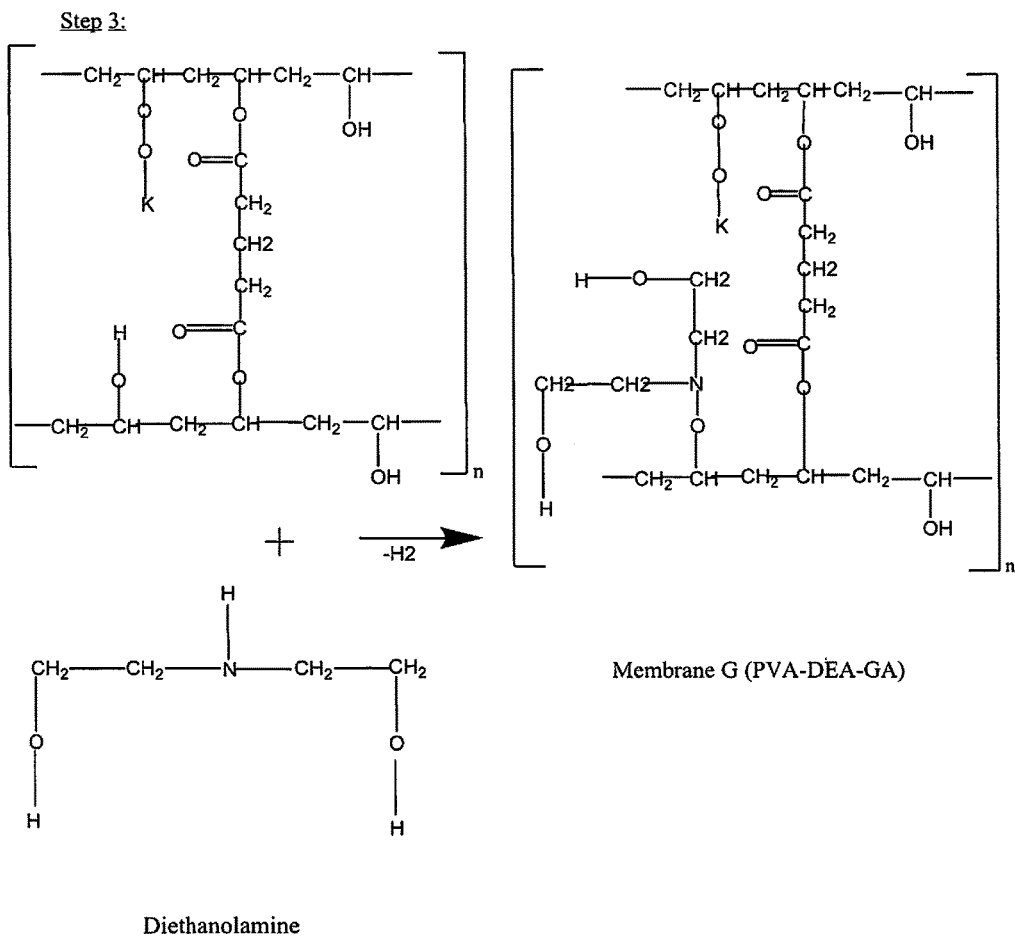

FIGS. 13A and 13B illustrate a reaction mechanism of a method of forming a casting solution for Membrane G. Referring to FIGS. 13A and 13B, 4.4 g of PVA is added to 40 ml of distilled water, followed by heating in a water bath at 80° C. (solution temperature), for 6 hours. 2 grams of KOH is added to 2 g of water in separate beaker. The KOH solution is heated at 80° C. in a water bath and stirred for about 10 minutes.

The KOH solution is dropped into the PVA and stirred for about 10 min, at about 80° C. (solution temperature) in a water bath. The KOH acts as an initiator in the solution. The KOH solution should not be added at room temperature to PVA solution, as it forms agglomerates. Then, 5.06 g of Gultaraldehyde is dropped into the solution and stirred for about 150 minutes, at about 80° C. (solution temperature).

1.03 g of diethanolamine (DEA) is then added to the solution and stirred at 70° C. (solution temperature) in a water bath, for 6 hours. The solution is then heated in an oven at 60° C., for two days, in an inert environment, while covered with aluminum foil having 0.2 cm holes, resulting in solvent evaporation and an increase in viscosity.

The solution may then be filtered and sonicated for about 10 minutes, to remove bubbles from the solution. The duration of the sonication may be increased if bubbles persist. After sonication, the casting solution for Membrane G is complete.

Figure 14A:
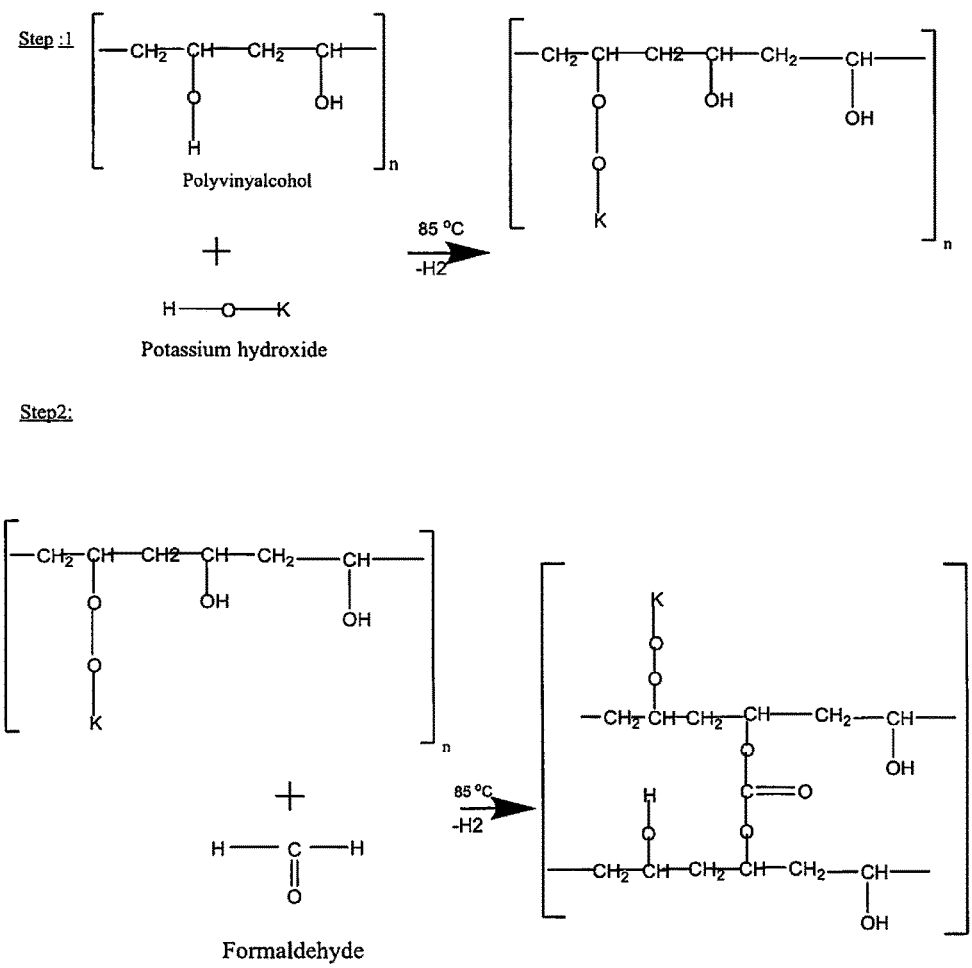
FIGS. 14A and 14B illustrate a reaction mechanism of a method of forming Membrane G2.
Figure 14B:
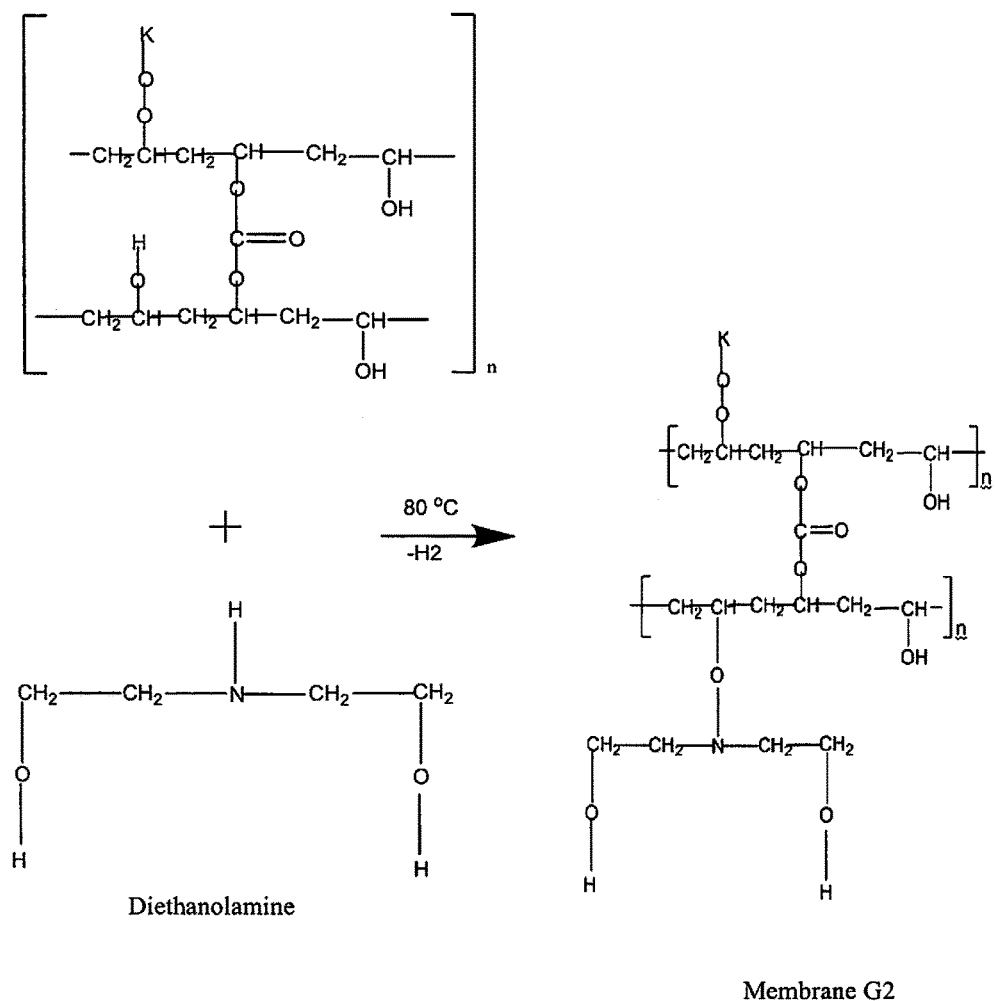

FIGS. 14A and 14B illustrate a reaction mechanism of a method of forming a casting solution for Membrane G2, where weight percentages relate to the weight of the distilled water. Referring to FIG. 14, 200 ml of charged distilled water and 11 wt % PVA (99%+ hydrolyzed) are mixed in a 500 ml conical flask equipped with a magnetic needle. The resultant mixture is stirred at 85° C. for 15 minutes, until a clear PVA solution is produced. 5 wt % of potassium hydroxide (KOH), is dissolved in equal amount of water (5 wt %) and is heated at 85° C. for 15 min. The KOH solution is dropped into the PVA solution under continuous stirring.

6 wt % of formaldehyde is added to the PVA/KOH solution as a cross linker, about 15 minutes after the KOH is added. The resultant solution is then stirred continuously for about 3 hrs. 2.75 wt % DEA is then added to the solution and stirred for about 6 hrs, at about 80° C. The solution is transferred to 500 ml beaker and kept in oven at about 60° C., in an inert environment, for viscosity buildup. After about 24 hours, the viscosity was monitored until a viscosity of more than 2500 cP was obtained, due to solvent evaporation.

The solution may then be filtered and sonicated for about 10 minutes, to remove bubbles from the solution. The duration of the sonication may be increased if bubbles persist. After sonication, the casting solution for Membrane G2 is complete.

Figure 15A:
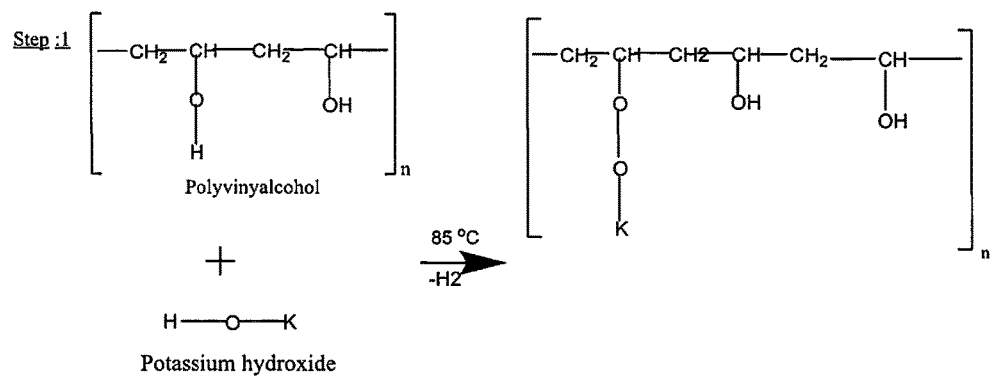
FIGS. 15A and 15B illustrate a reaction mechanism of a method of forming Membrane G3.
Figure 15A:
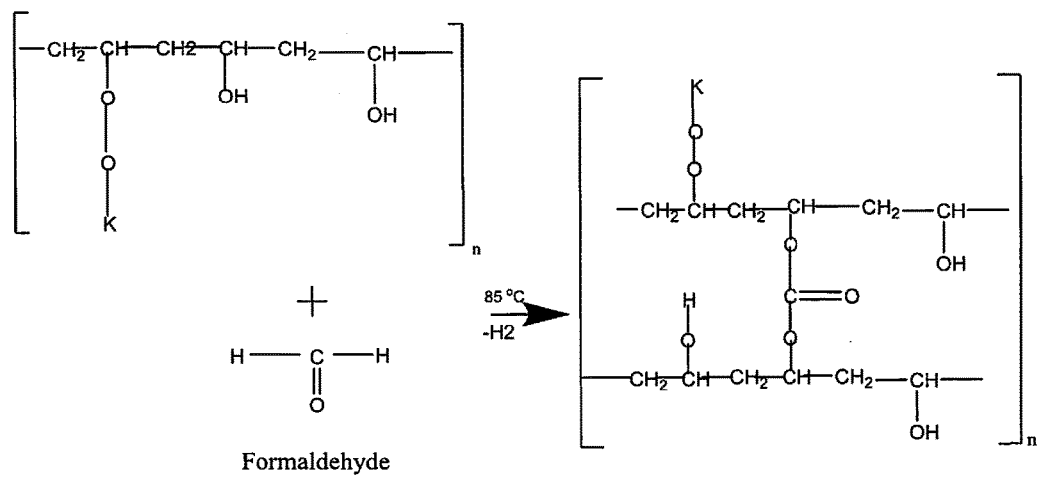
Figure 15B:
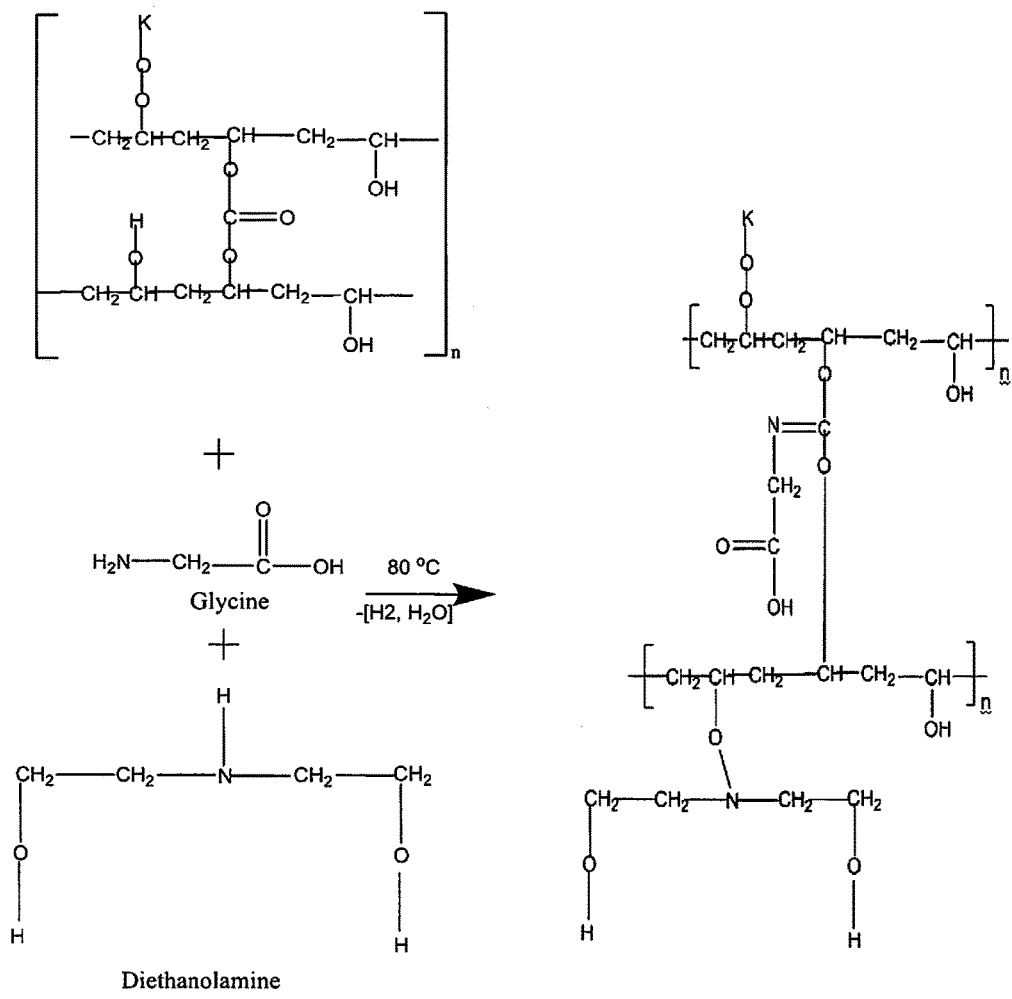

FIGS. 15A and 15B illustrate a reaction mechanism of a method for forming a casting solution for Membrane G3, where weight percentages relate to the weight of the distilled water. Referring to FIG. 15, 200 ml of charged distilled water and 11 wt % PVA (99%+ hydrolyzed) are mixed in a 500 ml conical flask equipped with a magnetic needle. The resultant mixture is stirred at about 85° C., until a clear PVA solution is produced. 5 wt % of potassium hydroxide (KOH), is dissolved in equal amount of water (5 wt %) and is heated at about 85° C. for about 15 min. The KOH solution is dropped into the PVA solution under continuous stirring.

6 wt % of formaldehyde is added to the PVA/KOH solution as a cross linker, 15 minutes after the KOH is added. The resultant solution is then stirred continuously for about 3 hrs. A solution of 2.75 wt % DEA, 2.75 wt % glycine, and 7.5 wt % distilled water is then added to the solution and stirred for about 6 hrs at about 80° C. The solution is transferred to 500 ml beaker and kept in oven at about 60° C., in an inert environment, for viscosity buildup. After about 24 hours, the viscosity was monitored until a viscosity of more than 2500 cP was obtained, due to solvent evaporation.

The solution may then be filtered and sonicated for about 10 minutes, to remove bubbles from the solution. The duration of the sonication may be increased if bubbles persist. After sonication, the casting solution for Membrane G3 is complete.

Figure 16:
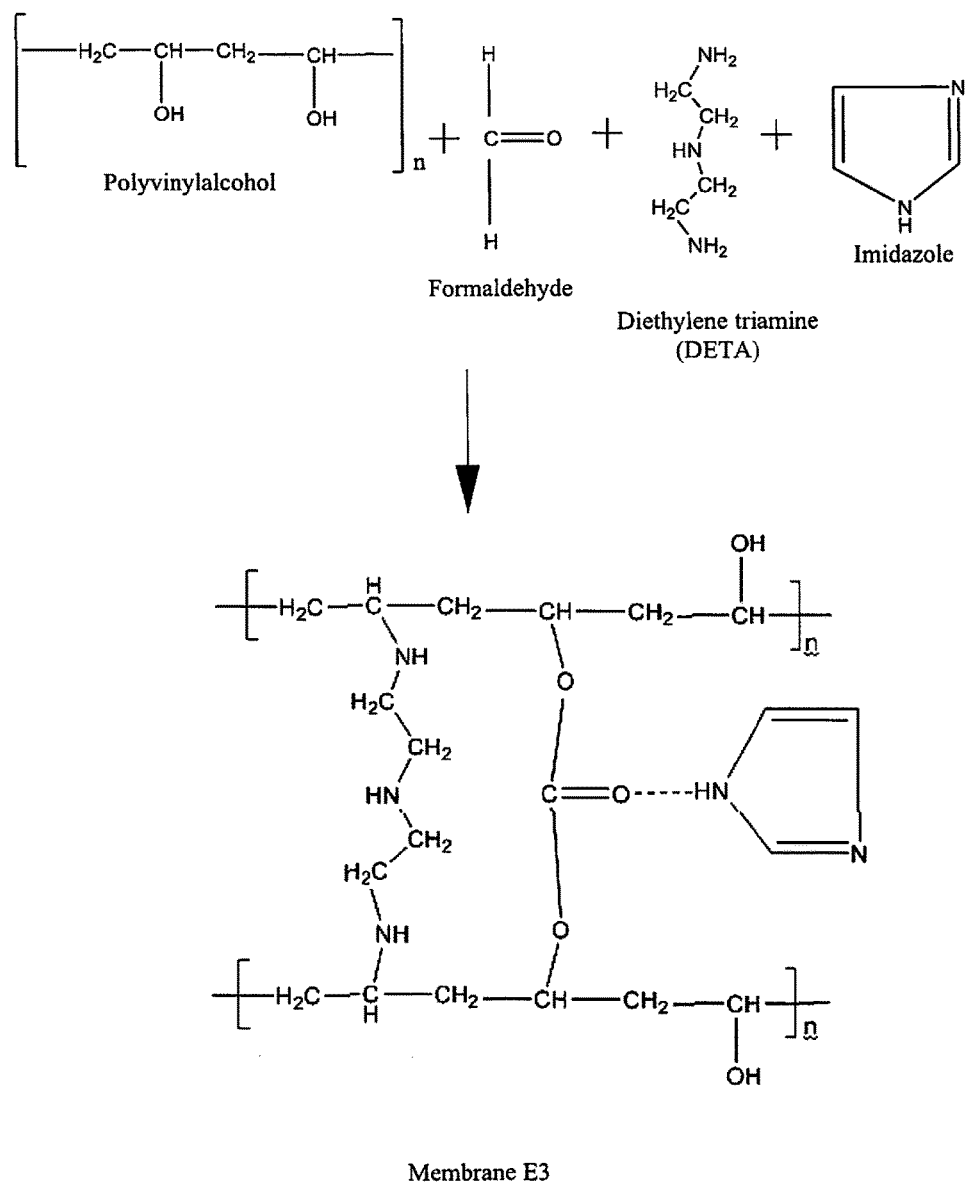
FIG. 16 illustrates a reaction mechanism of a method of forming Membrane E3.

FIG. 16 illustrates a reaction mechanism of a method for forming a casting solution for Membrane E3, where weight percentages relate to the weight of the distilled water. Referring to FIG. 16, 200 ml of charged distilled water and 11 wt % PVA (99%+ hydrolyzed) are mixed in a 500 ml conical flask equipped with a magnetic needle. The resultant mixture is stirred at about 85° C., until a clear PVA solution is produced. 5 wt % of potassium hydroxide (KOH), is dissolved in equal amount of water (5 wt %) and is heated at about 85° C. for about 15 min. The KOH solution is dropped into the PVA solution under continuous stirring.

6 wt % of formaldehyde is added to the PVA/KOH solution as a cross linker, 15 minutes after the KOH is added. The resultant solution is then stirred continuously for about 3 hrs. 6.75 wt % DETA and 2.5 wt % of imidazole dissolved in 8.5 wt % distilled water is then added to the solution and stirred for 6 hrs at about 80° C. The solution is transferred to 500 ml beaker and kept in oven at about 60° C., in an inert environment, for viscosity buildup. After about 24 hours, the viscosity is monitored until a viscosity of more than 2500 cP is obtained, due to solvent evaporation.

The solution may then be filtered and sonicated for about 10 minutes, to remove bubbles from the solution. The duration of the sonication may be increased if bubbles persist. After sonication, the casting solution for Membrane E3 is complete.

Membrane Casting

The above casting solutions may be cast into membranes using Petri dish casting, manual casting, or automated casting and drying procedures, such as tape casting. In particular, the Petri dish casting may include pouring the casting solution in a Petri dish, which is then heated in an oven at 60° C. for 24 hours. Then the temperature is increased for two hours to 80° C., for membrane B and to 120° C. for membranes C, E and F. The Petri dish is allowed to return to room temperature, and then the membrane may be removed.

Water may be used during the removal to prevent sticking. If water is used during removal, edges of the membrane are separated from the Petri dish, and then the membrane is kept in an oven at 50° C. for 1 hour, after removing the excess water. Once the membrane is dried, it is removed from the Petri dish and stored in desiccator.

The manual casting may include using a glass rod wound with a sticking tape at two ends to obtain the desired thickness of membrane. The distance between the two sticking tapes depends on a desired membrane width. Corners of a non-porous Teflon sheet are attached to an A4-sized flat glass plate.

The casting solution is then poured on the Teflon sheet in a horizontal line that has a length that is less than the distance between inner ends of the sticking tape on the glass rod. The glass rod is then dragged slowly across the casting solution to form a uniform thin sheet of membrane casting solution. The casting solution is then dried in an oven to remove solvents and form a membrane. The temperature and duration of the drying is the same as disclosed above for the Petri dish casting.

The automated casting and drying may include using an automatic roller disposed on a film applicator. A doctor's blade disposed just in front of automatic roller may be set to a height of about 1 mm using a screw adjustment. The speed of automatic roller may be set to 50. A Teflon sheet is placed on film applicator, and approximately 40 ml of the casting solution is poured on the Teflon sheet. The automatic roller moves doctor's blade across on Teflon sheet to uniformly apply the casting solution.

The applied casting solution is then dried in an oven at 60° C., for 24 hours. During the drying, glue (Fevicol) is applied to a glass slab, and then the glass slab is place over the Teflon sheet, to avoid membrane curling/crumbling during and/or after drying. After 24 hours, the temperature of the oven is increased to 120° C., for 2 hours, to facilitate cross-linking, and complete the formation of a membrane. Once cross-linking is complete, the membrane is removed from the Teflon sheet and placed between filter paper or butter paper. Any excess solvent may be removed with tissue paper.

According to some embodiments, the automated casting may be performed using 200 μm roller and without using a doctor's blade. The doctor's blade is generally used when a desired thickness is more than 90-100 μm (the final thickness).

According to various embodiments, the viscosity of each casting solution may be checked for each batch using a viscosity meter, in order to maintain consistency in membrane quality. The drying operations may occur in an inert atmosphere to prevent amine carrier oxidation. The use of Teflon sheets allows for membranes to be removed without being damaged. According to some embodiments, the consistent stirring during carrier addition to a PVA solution including a cross-linker, prevents gel formation.

Polymers containing highly hydrolysable species exhibit high swelling tendency. Swelling (due to water uptake) is beneficial for carrier mobility and, therefore, permeability, but too much swelling can result in poor mechanical integrity, carrier loss, and degradation over time of selectivity/permeability, and may limit high temperature operations. According to various embodiments, highly hydrolyzed PVA (99%+) is used, which allows for swelling to be controlled more effectively by cross-linking, thereby reducing the swelling of the polymer and retaining the membrane selectivity. The amount of cross-linker can be controlled, in order to control the degree of cross-linking and the associated reduction in swelling. Alternatively functionalized nanotubes/filler can be added to cross-linked polymer, which will decrease the swelling of the polymer and increase the tensile strength of the polymer.

Method of Forming Support

According to various embodiments, a suitable porous polysulfone support may be formed by the following sequential solvent extraction method (sequential solvent exchange), where weight percentages are taken with respect to the weight of a solvent (N, N' dimethyl acetamide). In particular, 15 ml of charged N, N' dimethyl acetamide solvent is deposited in a 100 ml conical flask equipped with a magnetic needle. 15 wt % of polysulfone (mol. wt. 55000 Da) is then added to the flask containing the N, N' dimethyl acetamide solvent. The resultant solution is stirred at ambient conditions, until a clear solution was obtained. Then, 10 wt % polyvinyl pyrrolidone (PVP) (mol. wt. 250000 Da) is added to the flask and stirred until a clear solution is obtained. The solution is then poured on clean glass plate, and an appropriate thickness film may be cast using a micrometer adjusted film applicator.

The resultant film is immediately immersed in distilled water for about 24 hours. The film is then washed with isopropanol 5 to 6 times, and then immersed in isopropanol for 2 hours. The film is then washed 5 to 6 times in methanol, and then immersed in methanol for about 3 hours. The film is then dried at 60° C., for 3 hrs, resulting in the formation of a support.

The PVA addition occurs under continuous stirring, in order to avoid gel formation. According to various embodiments, the average molecular weight of the PVP may be adjusted, in order to adjust the pore size of the support. According to various embodiments, the porous polysulfone support preparation is just a physical phenomenon of mixing, solubilizing, and precipitating to create the pores. In the preparation process no net change of chemical structure or charge transfer takes place, as the system moves from thermodynamically stable to unstable points.

According to various embodiments, a weight ratio of the polysulfone to the polyvinyl pyrrolidone in the support may range from about 2:1 to about 1:1. In some embodiments the weight ratio of the polysulfone to the polyvinyl pyrrolidone in the support may be about 1.5:1.

The casting of the film may also be performed using a thin film applicator or an auto caster, which may provide for better thickness control. The casting occurred on a glass plate in order to facilitate manual casting of a uniform flat support.

A carbon dioxide separation membrane may be formed directly on the support, in order to form a membrane structure. In the alternative, a carbon dioxide separation membrane may be separately formed and then disposed on the support, in order to form a membrane structure.

Accordingly, the present disclosure provides membranes that may improve the overall efficiency of a SOFC system by removing $CO_2$ from fuel. In addition, the membranes may increase overall SOFC stack life, by providing for a higher beginning of life (BOL) voltage. The membranes may also provide for a reduction in recycle blower power loading. In addition, the present disclosure provides for membranes that have improved swelling control, robustness, and lifetime. In addition, the present disclosure provides membranes that exhibit a low delta pressure, such as a delta pressure of less than 5 PSI, less than 2.5 PSI, e.g., 0.5 PSI.

According to some embodiments, a filler may be added to the cross-linked polymer of a polymer membrane. The filler may operate to control swelling and/or increase the tensile strength of the polymer. The filler may include functionalized carbon nanotubes, multi-walled carbon nanotubes, graphene, carbon nanofibers, and/or inert polymers such as polyvinyl alcohol, sulfonated polybenzimidazole, or the like. High molecular weight polymers may be included to resist swelling.

In general, one embodiment method of making the porous support includes applying a polysulfone and polyvinyl pyrrolidone (PVP) containing solution to a support to form a film followed by performing a sequential solvent extraction to form the porous support. For example, the sequential solvent extraction may include immersing the film in a first solvent to perform a first solvent extraction step, and then immersing the film in a second solvent to perform a second solvent extraction step. The film is then dried to form the porous membrane support.

Any suitable solvents may be used during the solvent extraction. For example, the first solvent may comprise isopropanol, and the second solvent may comprise methanol. Preferably, the film is washed a plurality of times. For example, the film is washed in water and then washed a plurality of times (e.g., 5-6 times) in isopropanol before being immersed in isopropanol for at least 1 hour, such as 1-4 hours (e.g., about 2 hours). After being immersed in isopropanol, the film is washed a plurality of times (e.g., 5-6 times) in methanol before being immersed in methanol for at least 2 hours, such as 2-5 hours (e.g., about 3 hours). After drying the porous polysulfone containing support has an average pore size ranging from about 40 to about 90 μm. A carbon dioxide separation membrane can then be formed on porous support as described above.

In general, an embodiment method of forming a casting solution for forming the carbon dioxide separation membrane includes mixing the PVA, solvent, initiator and cross-linker and/or carrier, followed by increasing the viscosity of the solution. For example, the method may include mixing the polyvinyl alcohol (PVA), the solvent, and the initiator to form a first solution. The method may then include mixing the cross-linker into the first solution, and mixing the carrier into the first solution. In above described embodiments where the cross-linker and carrier comprises the same material (e.g., DETA), the steps of mixing the cross-linker and the carrier occur at the same time and constitute the same step (e.g., mixing DETA into the first solution). If desired, the first solution may be sonicated before the increasing of the viscosity of the first solution. The viscosity of the first solution is then increased to at least about 2500 cp, such as from about 15000 cp to about 20000 cp, to form the casting solution.

In one embodiment, the initiator comprises KOH, the cross-linker comprises formaldehyde, and the carrier comprises one or more selected from diethanolamine (DEA), diethylenetriamine (DETA), glycine, or imidazole. Preferably, the PVA is at least about 99% hydrolyzed.

In one aspect, the step of mixing of the carrier further comprises heating the solution at about 60-100° C., such about 80° C. as for at least 4 hours, such as 4-10 hours, e.g., about 6 hours, and increasing of the viscosity of the first solution comprises heating the first solution at about 40-80° C., such about 60° C. for at least 18 hours, such as 18-36 hours, e.g., about 24 hours in an inert environment.

The casting solution is cast onto a support and heated to form the carbon dioxide separation membrane. In one embodiment, the support comprises the above described porous polysulfone and polyvinyl pyrrolidone containing support having an average pore size ranging from about 40 to about 90 m. In another embodiment, the support comprises a removable polymer support, such as a polytetrafluoroethylene (PTFE) or a similar low-sticking coefficient fluoropolymer sheet. The carbon dioxide separation membrane is then removed from the removable support to form a free standing carbon dioxide separation membrane.

In general, an embodiment of a method of forming a free standing carbon dioxide separation membrane includes applying a membrane casting solution to a PTFE sheet, heating the casting solution to form a carbon dioxide separation membrane, and removing the carbon dioxide separation membrane from the PFTE sheet to form the free standing a carbon dioxide separation membrane. In one aspect, the heating of the casting solution comprises heating the casting solution at 50-80° C. (e.g., about 60° C.), for at least 18 hours, such as 18-36 hours (e.g., about 24 hours); and then heating the casting solution at a higher temperature, such as at 100-140° C. (e.g., about 120° C.), for at least 1 hour, such 1-4 hours (e.g., about 2 hours). In one aspect, the casting solution comprises the above described polyvinyl alcohol (PVA) containing solution having a viscosity of at least about 2500 cp.

The fuel cell systems described herein may have other embodiments and configurations, as desired. Other components, such as fuel side exhaust stream condensers, heat exchangers, heat-driven pumps, turbines, additional gas separation devices, hydrogen separators which separate hydrogen from the fuel exhaust and provide hydrogen for external use, fuel processing subsystems, fuel reformers and or water gas shift reactors, may be added if desired. Furthermore, it should be understood that any system element or method steps described in any embodiment and/or illustrated in any figure may also be used in systems and/or methods of other suitable embodiments described above even if such use is not expressly described.

The foregoing description of the invention has been presented for purposes of illustration and description. It is not intended to be exhaustive or to limit the invention to the precise form disclosed, and modifications and variations are possible in light of the above teachings or maybe acquired a practice of the invention. The description was chosen in order to explain the principles of the invention and its practical application. It is intended that the scope of the invention as defined by the claims appended hereto, and their equivalents.

The invention claimed is:

1. A carbon dioxide separation membrane comprising:
a base polymer comprising poly vinyl alcohol (PVA);
a carrier selected from:
   imidazole; and
   benzimidazole;
a cross-linker comprising DETA
wherein the carbon dioxide separation membrane is configured to operate at temperatures ranging from about 80° C. to about 150° C.

2. The membrane of claim 1, wherein the membrane has a PVA to carrier mol ratio ranging from about 5:1 to about 10:1.

3. A carbon dioxide separation membrane comprising:
a base polymer comprising poly vinyl alcohol (PVA); and
a carrier comprising PANI,
wherein the membrane has a PVA to carrier mol ratio ranging from about 275:1 to about 325:1, and
wherein the carbon dioxide separation membrane is configured to operate at temperatures ranging from about 80° C. to about 150° C.

4. The membrane of claim 1, wherein the membrane is configured to operate at a temperature ranging from about 100 to about 140° C.

5. The membrane of claim 1, wherein the PVA is at least about 99% hydrolyzed.

6. The membrane of claim 1, wherein from about 20% to about 25% of monomers of the PVA are cross-linked.

7. The membrane of claim 1, wherein the carrier comprises imidazole.

8. The membrane of claim 1, wherein the carrier comprises benzimidazole.

9. The membrane of claim 3, wherein the membrane is configured to operate at a temperature ranging from about 100 to about 140° C.

10. The membrane of claim 3, wherein the PVA is at least about 99% hydrolyzed.

11. The membrane of claim 3, wherein from about 20% to about 25% of monomers of the PVA are cross-linked.

12. The membrane of claim 3, further comprising a cross-linker selected from:
formaldehyde;
DETA;
DETA and formaldehyde;
potassium hydroxide and formaldehyde; and
gultaraldehyde and potassium hydroxide.

13. The membrane of claim 12, wherein when the cross-linker is formaldehyde.